United States Patent [19]

Sinkkonen

[11] Patent Number: 4,730,685

[45] Date of Patent: Mar. 15, 1988

[54] APPARATUS FOR MOVING A MULTI-WHEELED VEHICLE

[75] Inventor: Matti Sinkkonen, Vaajakoski, Finland

[73] Assignee: Tana Jyra Ky, Finland

[21] Appl. No.: 905,858

[22] Filed: Sep. 10, 1986

Related U.S. Application Data

[63] Continuation-in-part of Ser. No. 649,714, Sep. 12, 1984, abandoned.

[30] Foreign Application Priority Data

Sep. 13, 1983 [FI] Finland .................................. 833275

[51] Int. Cl.⁴ .................................................. B64F 1/04
[52] U.S. Cl. ....................................... 180/74; 180/904
[58] Field of Search ................. 180/904, 74; 301/6 D; 305/11, 57; 74/421

[56] References Cited

U.S. PATENT DOCUMENTS

| | | | |
|---|---|---|---|
| 2,826,161 | 3/1958 | Palmer | 113/50 |
| 2,987,133 | 6/1961 | Clifton | 180/14 |
| 2,997,121 | 8/1961 | Clifton et al. | 180/12 |
| 3,005,510 | 10/1961 | Phillips | 180/74 |
| 3,025,922 | 3/1962 | Savidge | 180/12 |
| 3,150,734 | 9/1964 | Duggar | 180/11 |
| 3,724,581 | 4/1973 | Terrell | 180/74 |
| 3,881,565 | 5/1975 | Parrish | 180/74 |
| 3,937,290 | 2/1976 | Benning | 180/74 |
| 4,125,029 | 11/1978 | Krezak et al. | 180/74 |
| 4,413,693 | 11/1983 | Derby | 180/74 |

FOREIGN PATENT DOCUMENTS 1031098  6/1953  France .................................. 180/74
452527  12/1974  U.S.S.R. .

*Primary Examiner*—Richard A. Bertsch
*Attorney, Agent, or Firm*—Hale and Dorr

[57] ABSTRACT

This invention relates to a driving apparatus being provided for an aircraft or other wheeled vehicle by providing at least two frictional rollers which are mounted spaced from each other and adapted to be positioned on opposite sides of the wheel assembly of the vehicle, whether this wheel assembly consists of a single wheel or two or more wheels. A moving or pressing means is provided for pressing the rollers into frictional contact with the wheels of such wheel assemblies by, for example, controlling the spacing between the rollers. Drive means are then provided for rotating at least one of the friction rollers causing the vehicle wheel or wheels in contact therewith to also be rotated to move the vehicle.

63 Claims, 30 Drawing Figures

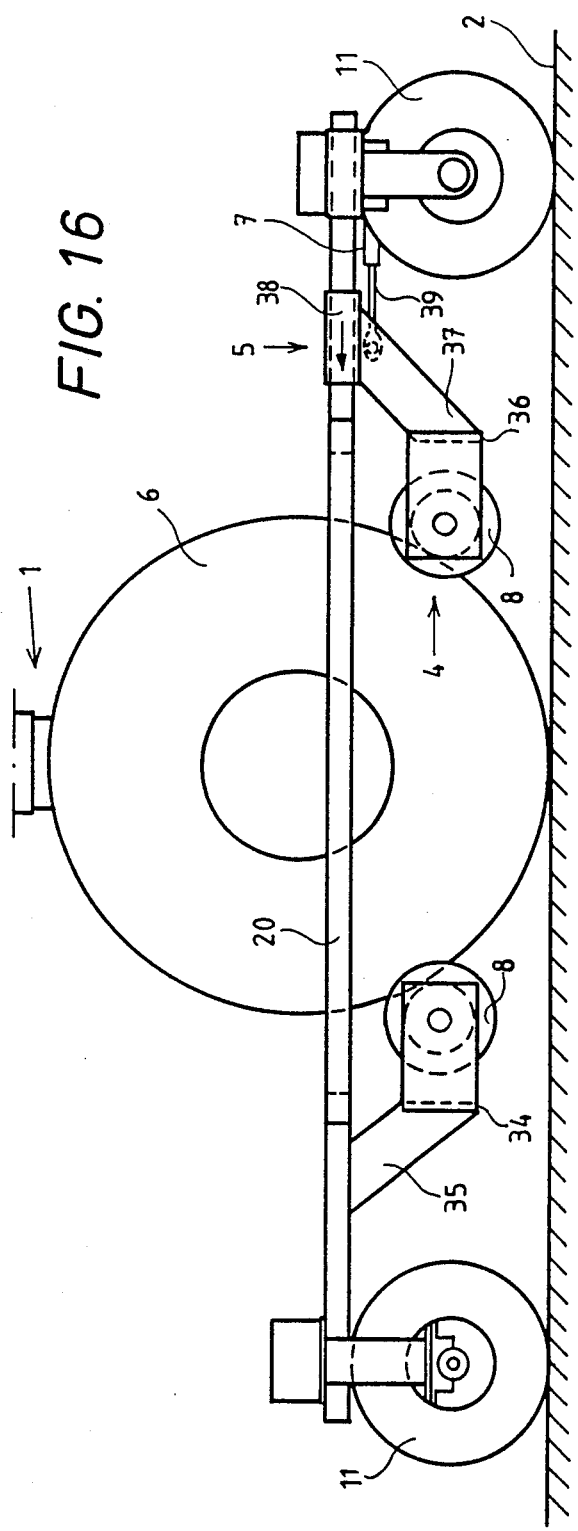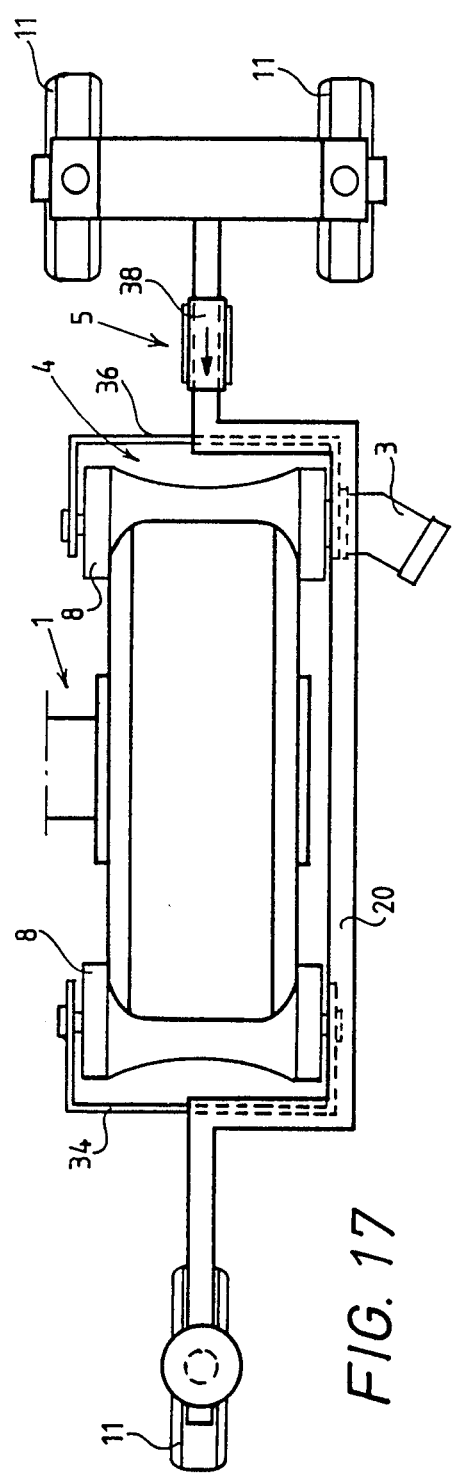

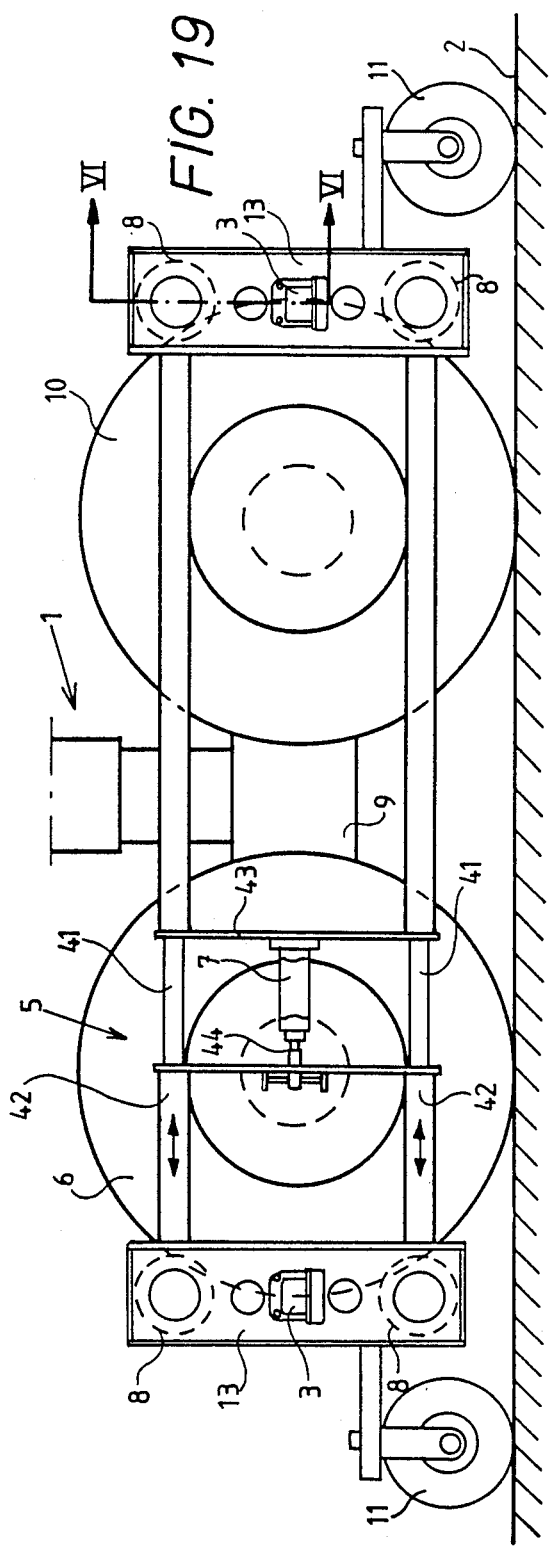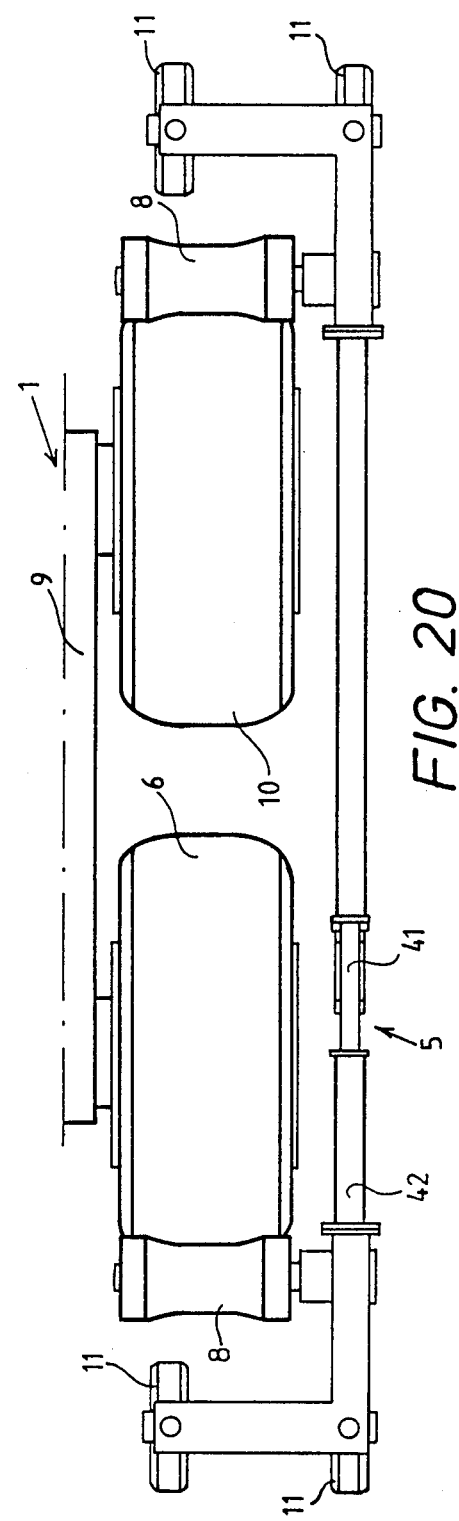

APPARATUS FOR MOVING A MULTI-WHEELED VEHICLE

This is a continuation in part of application Ser. No. 649,714 filed Sept. 12, 1984 which application is now abandoned.

BACKGROUND OF THE INVENTION

This invention relates to an apparatus for moving a vehicle having one or more wheels or wheel assemblies on a predetermined surface and, more particularly, to an apparatus which is adapted to move such a vehicle by rotating at least one wheel of the vehicle through an element functionally engaging the wheel periphery.

There are many situations where a heavy wheeled vehicle such as an airplane, trailer, or railway car must be moved for short distances on a surface such as land, road, and an airfield runway, the floor of a building, a railway track or the like through use of some sort of auxiliary towing apparatus. In such situations, it is frequently not possible or not economic to use the engines of the vehicle itself or the normal towing mechanism for the vehicle, such a truck rig or locomotive, to move the vehicle either because of the position or maneuvering requirements of the vehicle or because the fuel expended by the normal drive mechanism would be far greater than the existing moving requirements require.

An example of the type of situation indicated above is the moving of an aircraft on the ground either into or from a hanger for repair or storage or between the loading ramp and a runway for takeoff or landing. Particularly for large jet aircraft, and particularly where the aircraft must wait for some period of time after it starts moving to the runway before it is cleared for takeoff, using the airplane's engines to move the aircraft on the ground uses a significant amount of fuel. It also requires that the aircraft's brakes be used to stop the aircraft and to control the speed of the aircraft against the thrust of the jet engines, causing wear on the aircraft brakes.

To overcome the above problems, towing tractors have been heretofore used to move aircraft on airfield runways and ramps. However, since modern aircraft becoming increasingly heavy, the towing tractors must also be made larger and heavier in order to be able to achieve sufficient traction to be able to tow heavy aircraft. These vehicles also require large wheels to achieve traction, efficient brakes, and heavy axles. As the size of these vehicles have increased, they have become increasingly expensive and clumsy. In addition, additional personnel has been required to attach the towing bars of such tractors to the aircraft as well as to operate the tractor, further increasing the cost of using such vehicles.

Attempts have been made to replace the towing tractors with smaller, more maneuverable, and easier to operate moving apparatus which are adapted to make driving frictional contact with the peripheral surface of at least of one of the aircraft landing wheels to cause rotation of the landing wheels and thus movement of the aircraft. With such apparatus, the weight of the aircraft itself provides the required ground traction so that relatively small and easily maneuverable apparatus may be utilized. Examples of the devices of this type are shown in U.S. Pat. Nos. 2,997,121; 3,005,510; 3,025,922 and 3,150,734. However, devices of the type described in these patents have not come into general use because they have limitations as to the type of aircraft wheels which they can be attached to and cannot be used universally with any type of aircraft. For example, the apparatus described in U.S. Pat. No. 3,005,510 can only be attached to the landing gear of an airplane that has its landing wheels arranged as a bogie, with at least two wheels within certain predetermined distances from each other. The moving apparatus can then be placed between and adjusted to make frictional contact with both wheels. This apparatus cannot for example be used with the nose wheel of an aircraft which has only a single wheel or a pair of wheels which are coaxial.

While the apparatus described in the other U.S. Patents indicated above can be attached to a landing gear that has a single wheel, these apparatus must be locked to the ends of the axle of a wheel of a aircraft to enable their drive roller to be pressed against the aircraft wheel. Since the wheels of aircrafts are of many sizes and widths, and as the construction of their axles vary greatly, it is not possible to construct an apparatus of the type described in these patents which would be usable with all aircraft.

SUMMARY OF THE INVENTION

It has been found that the problems indicated above can be overcome, and that a relatively small, easily maneuverable and relatively efficient, driving apparatus can be provided for an aircraft or other wheeled vehicle by providing at least two friction rollers which are mounted spaced from each other and adapted to be positioned on opposite sides of the wheel assembly of the vehicle, whether this wheel assembly consists of a single wheel or two or more wheels. A moving or pressing means is provided for pressing the rollers into frictional contact with the wheels of such wheel assembles by, for example, controlling the spacing between the rollers. Drive means are then provided for rotating at least one of the friction rollers causing the vehicle wheel or wheels in contact therewith to also be rotated to move the vehicle, Preferably, the rollers and the pressing means are mounted in a U-shaped frame which is adapted to fit around the wheel assembly in a manner such that the rollers mounted therein are on opposite horizontal sides of the wheels of the assembly. The pressing means may, for example, include a means for controlling the length of the connecting leg of the U-shaped member, the rollers being pressed against the wheels of the vehicle when the connecting leg is shortened. One or more ground wheels may also be attached to the frame and may be freely turnable or turnable by a suitable means to permit the assembly to be maneuvered into position around the wheel assembly. Since a device of this invention relies on the moving or pressing means to always maintain at least two rollers in frictional contact with opposite sides of a wheel or wheels of the wheel assembly, it does not require that the device be attached to the axle of the wheel and can operate with a wheel or wheels of a wheel assembly having relatively large size variations without difficulty.

The foregoing and other objects, features and advantages of the invention will be apparent from the following more particular description of preferred embodiments of the invention as illustrated in the accompanying drawings.

BRIEF DESCRIPTION OF DRAWINGS

FIG. 16 is a side elevation view of an eighth embodiment of moving apparatus of the invention, attached to the nosewheel of an airplane.

FIG. 17 is a top plan view of the moving apparatus of FIG. 16.

FIG. 19 is a side elevation view of a ninth embodiment of the moving apparatus of the invention attached to the bogie of the landing gear of an airplane.

FIG. 20 is top plan view of the moving apparatus of FIG. 19 and a part of the bogie of an airplane.

Figure 1:
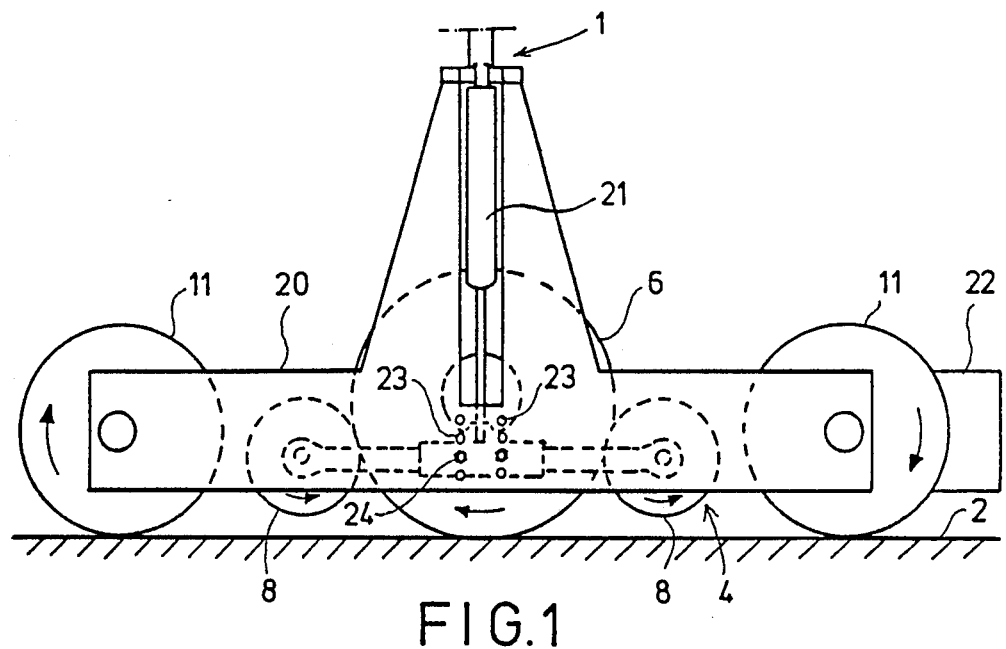
FIG. 1 is a side elevation view of a moving apparatus according to a first embodiment of the invention shown in position to move the single nosewheel of an airplane.
Figure 2:
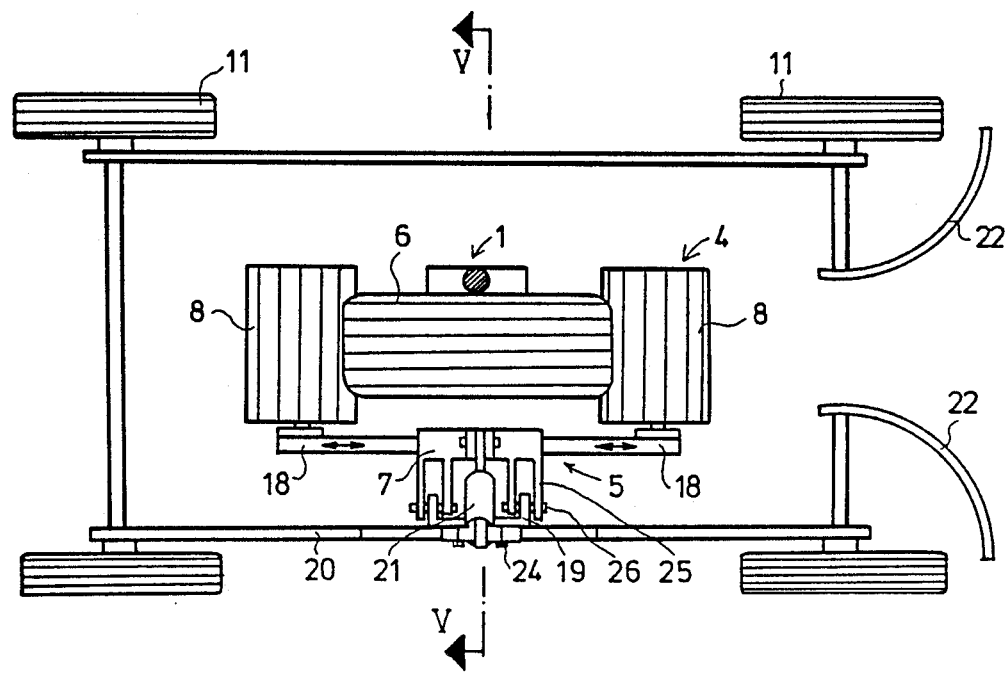
FIG. 2 is a top plan view of the moving apparatus of FIG. 1.

The above figures are intended to illustrate only the major components of the various moving apparatuses involved in the invention and are therefore somewhat schematic showing the apparatuses in various levels of detail.

DETAILED DESCRIPTION

Referring first to FIGS. 16 and 17, a moving apparatus of a preferred embodiment of the invention is shown which apparatus is designed to move an airplane 1 on an airfield or other ground surface 2. In these figures, only a part of the landing gear and of the nose wheel 6 of the airplane are shown. The moving apparatus consists of a pair of friction rollers 8, the left-hand friction roller being mounted on a support 34 which is attached by a connecting bar 35 to a U-shaped frame 20. Frame 20 has a left-hand extension on which a wheel 11 is mounted in a manner so as to be freeely turnable and a right-hand extension in the form of a slide bar 20'. A wheel support member 120 is mounted on the end of slide bar 20'. A pair of ground wheels are mounted on either end of member 120 in a manner so as to be freely turnable. Righthand friction roller 8 is mounted on a support bracket 36 which is attached by a connecting bar 37 to a slide sleeve 38 mounted to slide on slide bar 20'. Sleeve 38 and the elements attached thereto are moved by means of a hydraulic cylinder 7 which is attached on one side to frame 20. A piston rod 39 extends from the other side of cylinder 7 and is connected at its end to bar 37, underneath sleeve 38. Cylinder 7, piston rod 39, slide bar 20', and elements 36, 37 and 38 attached thereto all form part of a pressing means 5 which may be used to squeeze wheel 6 between friction rollers 8 with both rollers in frictional contact with the periphery of the wheel.

For the embodiment of the invention shown in FIGS. 16 and 17, the right-hand one of the drive rollers 8 is rotated by a drive element 3 which may, for example, be an electric or a hydraulic motor. The motor may be controlled in conventional fashion to rotate cylinder 8 from controls (not shown) on the moving apparatus itself or from controls which are located remote from the moving apparatus as, for example, on a transportation vehicle for the apparatus or in the cockpit of the airplane to be moved. Hydraulic cylinder 7 may be similarly controlled in conventional fashion either at the apparatus or remotely.

Figure 18:
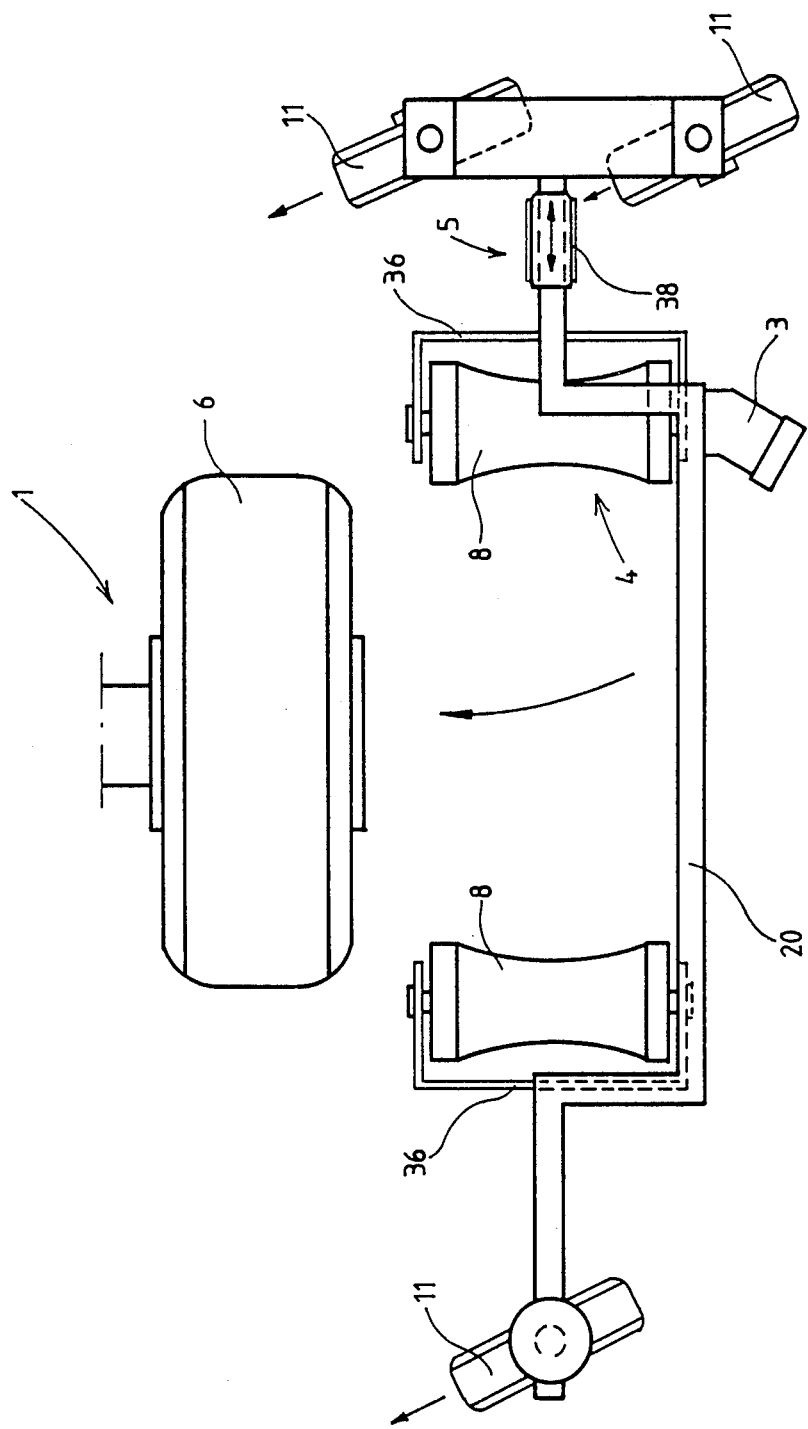
FIG. 18 corresponds to FIG. 17 and shows a moving apparatus according to the invention next to the nosewheel of an airplane before the apparatus is attached to the wheel of the vehicle to be moved.

Referring now to FIG. 18 in addition to FIGS. 16 and 17, it is seen that with sliding sleeve 38 retracted by cylinder 7 to its extreme right-most position, the moving apparatus may be maneuvered around the wheel 6 with the wheel entering the apparatus through the open end of U-shaped frame 20. Wheels 11 being mounted to be freely turnable permits the apparatus to be moved in any desired direction to maneuver the apparatus around wheel 6. The apparatus may be moved manually or by a suitable transport vehicle. In the alternative, a separate motor (not shown) may be provided for rotating one or more of the ground wheels for maneuvering the apparatus into position.

When the apparatus is in position about wheel 6, hydraulic cylinder 7 is actuated to move slide 38 and the elements attached thereto, including right-hand friction roller 8, to the left, as shown in figures, causing both rollers 8 to be pressed into frictional engagement with wheel 6. Motor 3 may then be operated to rotate the right-hand roller 8, causing the wheel 6 in frictional engagement therewith to also be rotated to move the vehicle. The apparatus being freely turnable on its ground wheels, will move in the same direction as the vehicle is caused to move by the pilot. When the aircraft 1 is in a desired position, the cylinder 7 is operated to retract piston 39 releasing the frictional pressure on wheel 6. The apparatus may then be moved out of engagement with wheel 6 either manually, under control of a transportation vehicle, through the operation of a motor or one or more of its ground wheels 11 or otherwise.

Figure 21:
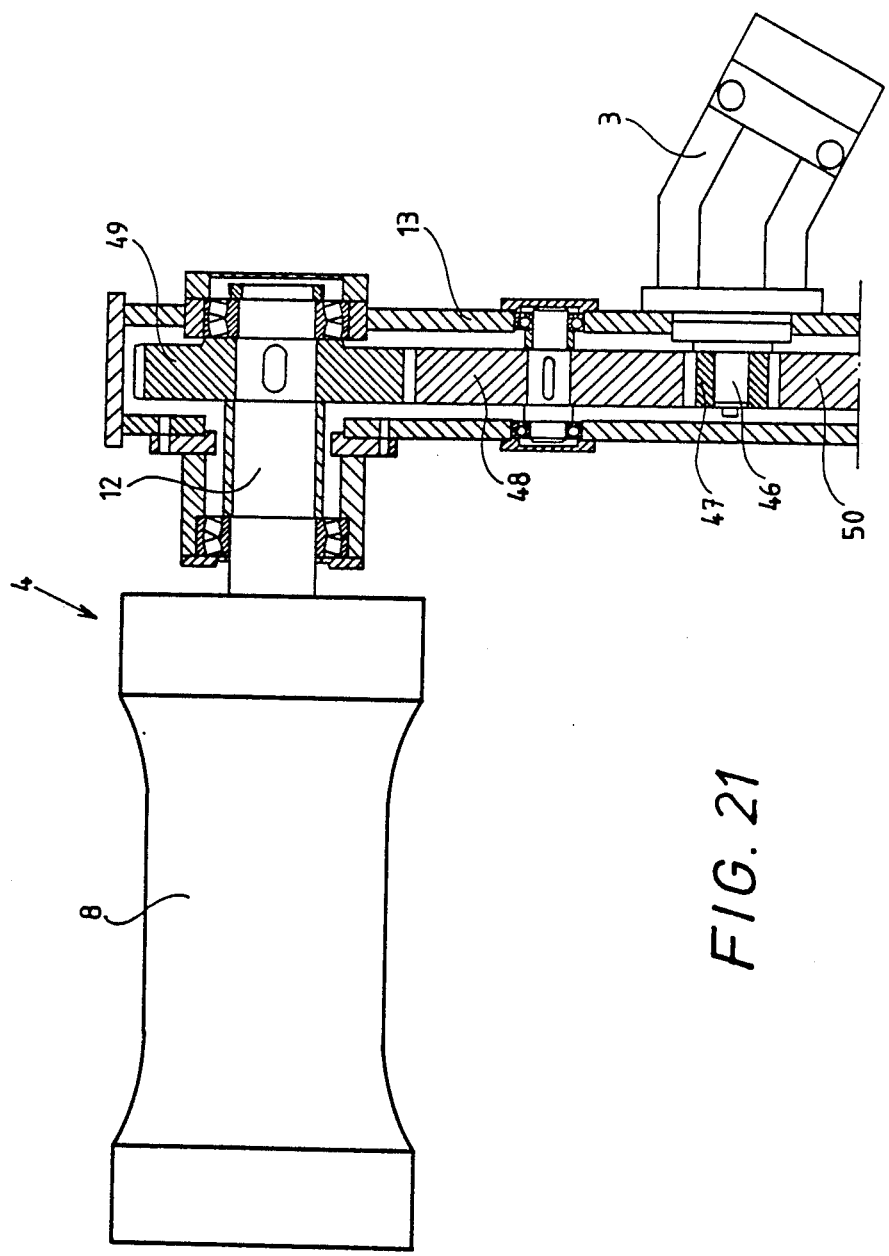
FIG. 21 is an enlarged sectional view of a portion of FIG. 20 taken on line 21—21.

FIGS. 19 and 20 illustrate another embodiment of the invention as used with the landing gear of an airplane 1 which consists of a bogie 9 of wheels 6 and 10. In this embodiment of the invention, the U-shaped frame has four ground wheels 11 mounted on it in a manner so as to be freely turnable. The connecting leg of the U-shaped frame has an upper and lower slide bar 41 each of which slide bars is fitted in a slide tube 42. The bars 41 are connected by a bar 43 and tubes 42 are connected by a bar 45. The length of the connecting leg of the frame is controlled by providing a hydraulic cylinder 7 attached to the bar 43 with the piston 44 of the cylinder being attached to bar 45. A right-hand gear box 13R is mounted on the end of slide bars 41, and the left-hand gear box 13L is mounted on the end of tubes 42. Referring now to FIG. 21, each gear box 13 has a drive element 3 such as a hydraulic or electric motor. The shaft 46 of motor 3 is attached to a cogwheel or gear 47. Gear 47 meshes with the intermediate gears 48 and 50. As seen in FIG. 21, intermediate gear 48 meshes with gear 49 which is attached to the shaft 12 of a friction roller 8. Gear 50 meshes with a gear similar to gear 49 (not shown) which is attached to the shaft of the lower friction roller 8 in gear box 13. Thus, each gear box 13 has a pair of friction rollers 8 which are both rotated in the same direction and at the same speed to cause the wheel of bogie 9 which they are in contact with to rotate.

In operation, cylinder 7 would initially be operated to separate the gear boxes 13 sufficiently to permit wheels 6 and 10 to be positioned between rollers 8. The manner in which cylinder 7 is operated and the manner in which the apparatus is positioned would be as described in conjunction with FIGS. 16, 17 and 18. While not shown in FIGS. 19 and 20, it is desirable for the embodiment of the invention shown in these figures to be able to raise and lower the gear boxes 13 so that the contact point for the upper roller 8 and lower roller 8 in each gear box with the corresponding wheel of aircraft 1 are spaced equally in the vertical direction. This may be accomplished, for example, by mounting the frame 20 on the wheels 11 with hydraulic cylinders which may be raised or lowered to properly position the height of the rollers 8 in the vertical direction either before or after the assembly is moved into position adjacent to bogie 9, or by other suitable control means. When the assembly is properly positioned, hydraulic cylinder 7 is operated in the manner previously described to retract piston 44 causing friction rollers 8 to be brought into frictional contact with wheels 6 and 10. Drive motors 13 may then be operated by suitable control means as previously indicated to rotate drive roller 8 and thus the wheels 6 and 10 in frictional content therewith to thereby drive aircraft 1. Since wheels 11 are freely turnable, directional control may be provided by the aircraft itself. When the aircraft is properly positioned, hydraulic cylinder 7 may be again operated to push piston 44 out, releasing the frictional contact between rollers 8 and wheels 6 and 10, and permitting the moving assembly to be removed from the wheel assembly 9 by suitable means as previously described.

Figure 22:
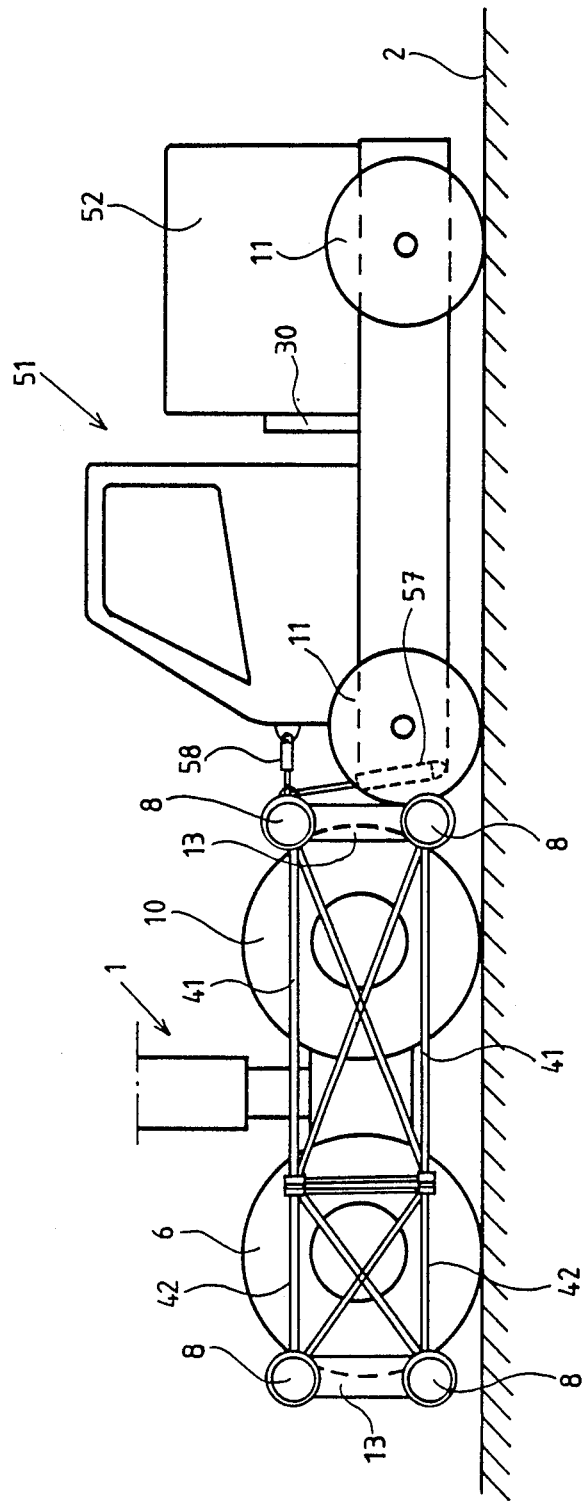
FIG. 22 is a side elevation view of the moving apparatus of FIG. 19 attached to the bogie of an airplane as an extension at one end of a transportation vehicle.

FIG. 22 shows a moving apparatus of the type shown in figure 19 (the ground wheels of the apparatus shown in FIG. 19 have been eliminated in FIG. 22, but a set of ground wheels may be provided at the left-hand side of the apparatus if required). Attached to the right-hand side of the apparatus is a transportation vehicle 51 which, among other things, provides the moving apparatus with a power source. In particular, a combustion engine 52 may be mounted on the transportation vehicle which engine operates a hydraulic pump 30. The hydraulic pump is connected in standard fashion, not shown in the figure, to operate the hydraulic motors 3 and the hydraulic cylinder 7. In addition, hydraulic pump 30 operates a pair of hydraulic cylinders 57 and 58 which are utilized to adjust the height of the moving apparatus so that the rollers 8 in each gear box 13 are spaced an equal distance in the vertical direction from the axis of the wheel which the cylinders are in contact with.

The apparatus of FIG. 22 operates in the same manner as the device shown in FIG. 19 and previously described to move the aircraft 1. When the apparatus is not moving the aircraft, the lower right one of the rollers 8 is in contact with the front wheel 11 of transport vehicle 51 and can be operated by its hydraulic motor 3 to move vehicle 51.

Figure 23:
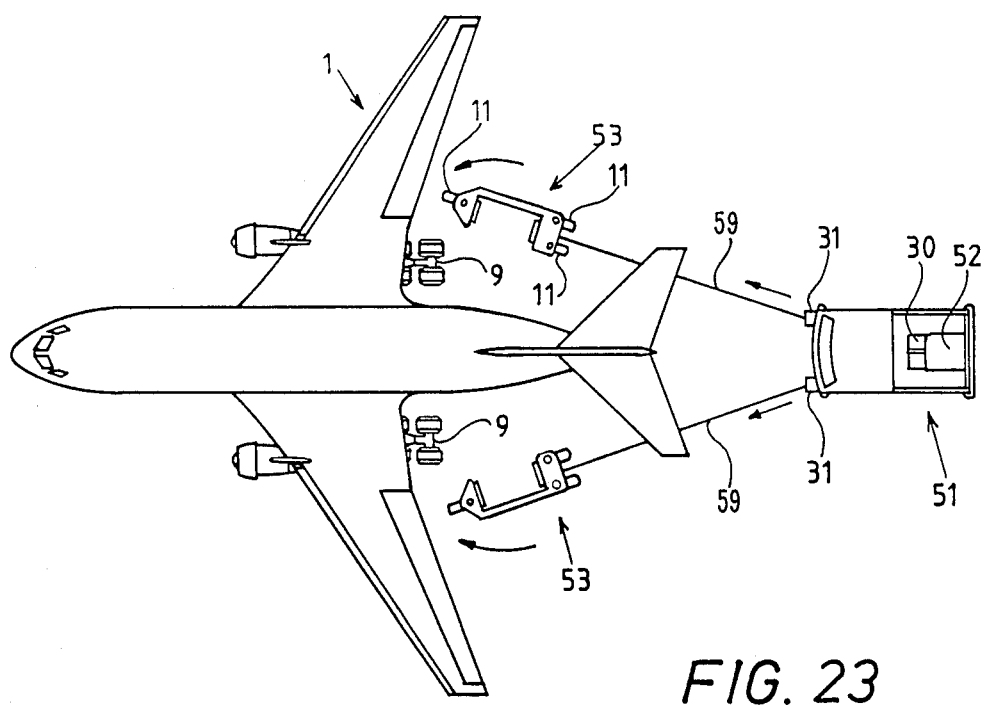
FIG. 23 is a top plan view of an airplane and a tenth embodiment of the invention, where moving apparatuses according to the invention are brought near both of the two main landing gears of the airplane.

FIG. 23 is a top plan view of a moving apparatus according to another embodiment of the invention being brought near an airplane 1 to move it. A transportation vehicle 51 is provided which is of the type shown in FIG. 22 and includes an internal combustion engine 52 for operating a hydraulic pump 30. A pair of moving apparatuses 53 are provided which may be of the type shown in FIG. 16 or FIG. 19, each of the apparatuses 53 being connected to the transportation vehicle 51 by a hydraulic hose 29.

The moving apparatuses 53 can be brought to the landing gears of bodies 9 of airplane 1 and attached to the wheels of the landing gears in a number of different ways. If the apparatus 53 are sufficiently light, human power can be used to position the apparatuses. With heavier apparatuses, this operation has to be mechanized either by providing means in the apparatuses 53 for driving one or more of the ground wheels 11 or by having the transportation vehicle 51 push the moving apparatuses 53 into position. As with previous embodiments, the controls for moving the apparatuses 53 can be in a position on the apparatuses themselves or remotely controlled from the transportation vehicle 51, the aircraft 1, or some other location.

Figure 24:
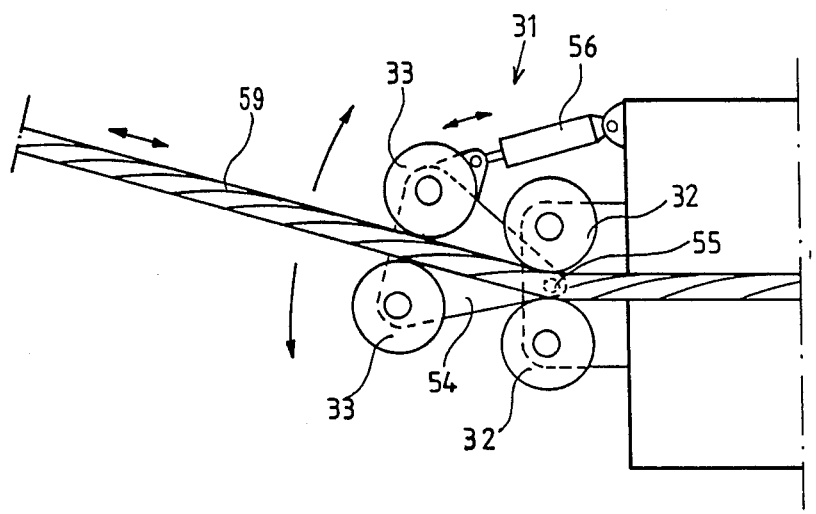
FIG. 24 is a top plan view of a control and feeding device for the hydraulic hose leading to a moving apparatus of FIG. 23.

FIGS. 23 and 24 illustrate one manner in which the moving apparatuses 53 may be pushed into position adjacent to the landing gear 9 of airplane 1. When hydraulic fluid under pressure is forced into hydraulic hoses 29, they become sufficiently stiff, if not too long, to be used for pushing and positioning apparatus 53. The positioning is done by feeding each hydraulic hose 29 from a reel through a feeding device 31 in the front of transportation vehicle 51. The feeding device 31 can also serve as a steering device so that the hydraulic hose 29 is turned left or right to cause a correspondent movement of the apparatus 53. In this case, the ground wheels 11 of the moving apparatus have to be freely turning.

FIG. 24 shows the structure of the steering and feeding devices 31. Each steering and feeding device 31 consists of two pairs of rollers, 32 and 33 between which the hydraulic hose 29 passes. The feeding rollers 32 are rotated by suitable drive means to feed or retract hose 29 to move the apparatus 53 forward or backward. The hose 29 is bent to steer apparatus 53 by bending rollers 33 journaled on the bending piece 54 which is pivoted on a vertical pivot 55. A hydraulic cylinder 56 is provided which controls the position of bending piece 54 and, thus of steering rollers 33 mounted thereon, to thereby control the side movements of apparatus 53.

FIGS. 1-6 illustrate still another embodiment of the invention. In this embodiment of the invention, the moving apparatus has a frame 20 with four ground wheels 11 mounted thereon. The ground wheels should be freely turning, but, as previously indicated, a suitable drive means such as an engine or motor can also be coupled to one or more of the ground wheels to move the apparatus when it is not attached to the wheel 6. The apparatus also includes a pair of friction rollers which are mounted on a pressing device 5 which is secured to frame 20 by a pair of bolts 24 positioned in one of a plurality of bolt holes 23. The selection of the proper bolt holes 23 controls the height of rollers 8. It is, however, apparent that the height of these rollers may be controlled in other ways previously indicated including by use of hydraulic cylinders.

The pressing device 5 consists of a hydraulic cylinder 7 having a pair of movable piston rods 18 extending from both ends. Friction rollers 8 are mounted at the end of each of the piston rods. The connecting member 7 is attached by means of cars 25 and hinge pins 26 to a lifting ear 19 attached in frame 20 at a desired height by bolts 24. The pressing device 5 may be raised to an inoperative position on the hinge pins 26 by means of a lifting cylinder 21 (see FIGS. 5 and 6). When in this position, rollers 8 are raised to a substantially vertical position so as to permit wheel 6 to be moved into or out of frame 20 through the opening in the front of the frame. Guides 22 are provided to assist in guiding the wheel 6 into frame 20.

Figure 3:
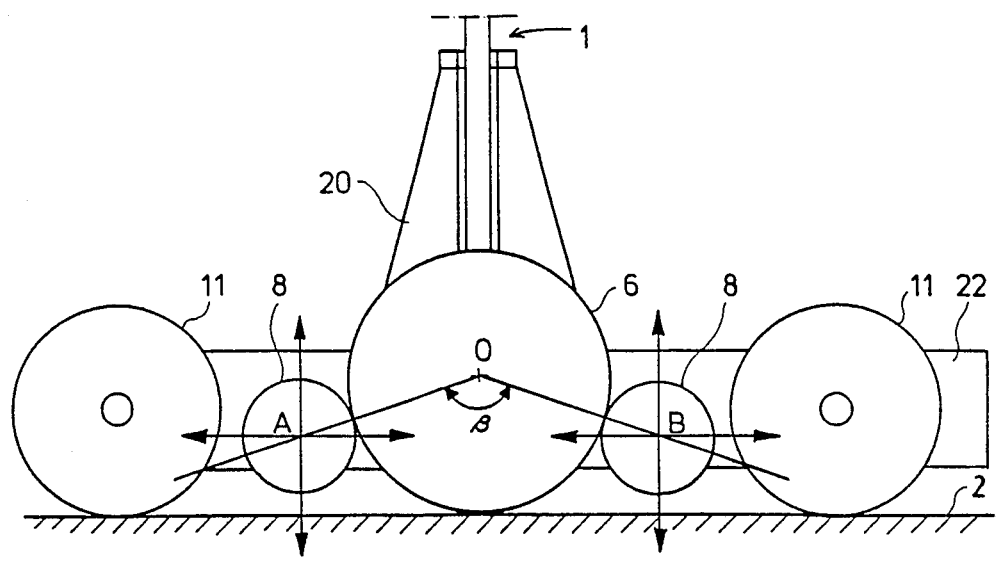
FIG. 3 is a schematic side elevation view of the embodiment of FIG. 1 showing the position of the rollers of the moving apparatus in relation to the wheel of the vehicle to be moved.

FIG. 3 shows the position of the friction rollers 8 of the moving apparatus of FIG. 1 in relation to the wheel 6 of the airplane 1. The position of these rollers in relation to each other is defined by angle $\beta$, the sides of which, OA and OB are formed by connecting the rotational axes A and B of the friction rollers 8 respectively with the rotational axis 0 of wheel 6. The most favorable value of the angle $\beta$ depends on circumstances, but is preferably between 90° and 180°. If this angle is kept constant, it is clear that when the size of the wheel 6 of the vehicle to be moved changes, the location of the friction rollers 8 also change. In FIG. 3, the arrows drawn through the rotation axes A and B of the friction rollers 8 show that the friction rollers can be moved both vertically and horizontally if necessary. These adjustment possiblities must be independent of each other since the height of the rollers is mainly determined by the diameter of the wheel 6 of the vehicle being moved, whereas the distance between the friction roller also depends on whether the wheel assembly which the apparatus 4 operates on as one wheel or a bogie. Further, for maximum frictional contact between the rollers 8 and the wheel 6, the axes A and B shall be below the vertical position of axes 0, permitting advantage to be taken of the weight of the aircraft 1 in maintaining frictional contact.

Figure 4:
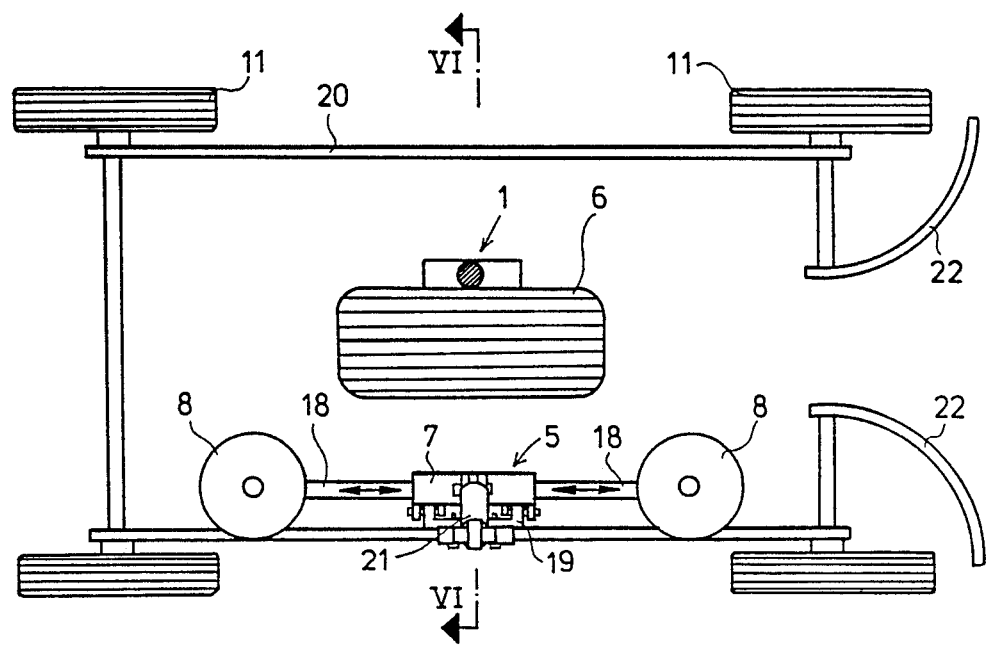
FIG. 4 corresponds to FIG. 2 and shows the moving apparatus with the friction rollers moved to an inoperative position.
Figure 5:
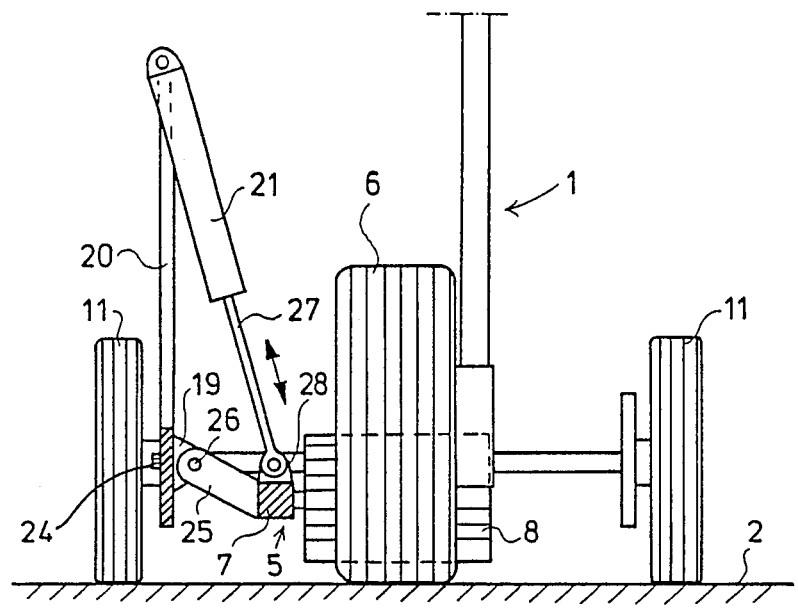
FIG. 5 is a sectional view, partly taken on line V—V of FIG. 2 and showing the moving apparatus from one end.
Figure 6:
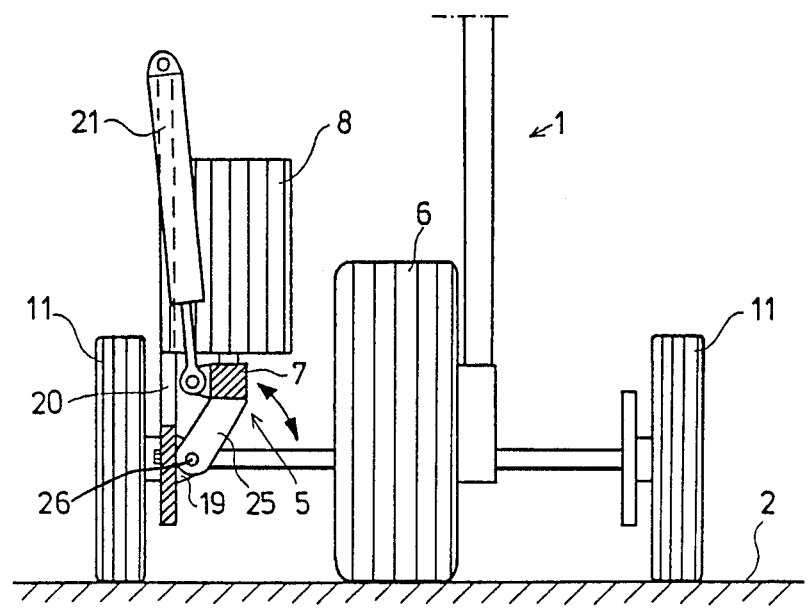
FIG. 6 is a fragmentary sectional view taken on line VI—VI of FIG. 4.

In operation, lifting cylinder 21 is initially operated to raise rollers 8 to their inoperative position as shown in FIGS. 4 and 6. The apparatus is then moved either manually, by a transportation vehicle or by use of one or more motors operating on wheels 11 to position wheel 6 through guides 22 and into frame 20 in the position shown in FIG. 4. When the apparatus is in the position shown in FIG. 4, cylinder 21 is again operated to lower friction rollers 8 to their operative position. Hydraulic cylinder 7 is then operated to retract pistons 18 causing rollers 8 to be moved into frictional contact with wheel 6. A motor 3 (not shown) may then be operated to rotate either one or both of the friction rollers 8 to move the vehicle. When the vehicle has reached the desired location, the above sequence of operations is reversed, cylinder 7 being operated to extend pistons 18 relieving the frictional pressure of rollers 8 on wheel 6, lifting cylinder 21 being operated to lift rollers 8 to their inoperative position, and the assembly then being moved by suitable means to permit wheel 6 to exit frame 20 through guides 22.

Figure 7:
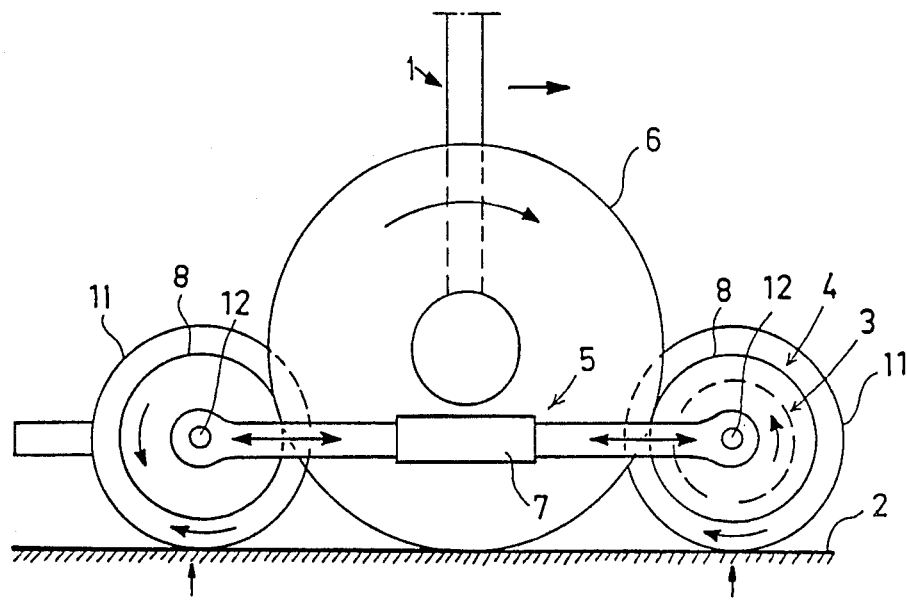
FIG. 7 is a side elevation view of a second embodiment of the moving apparatus of this invention.
Figure 8:
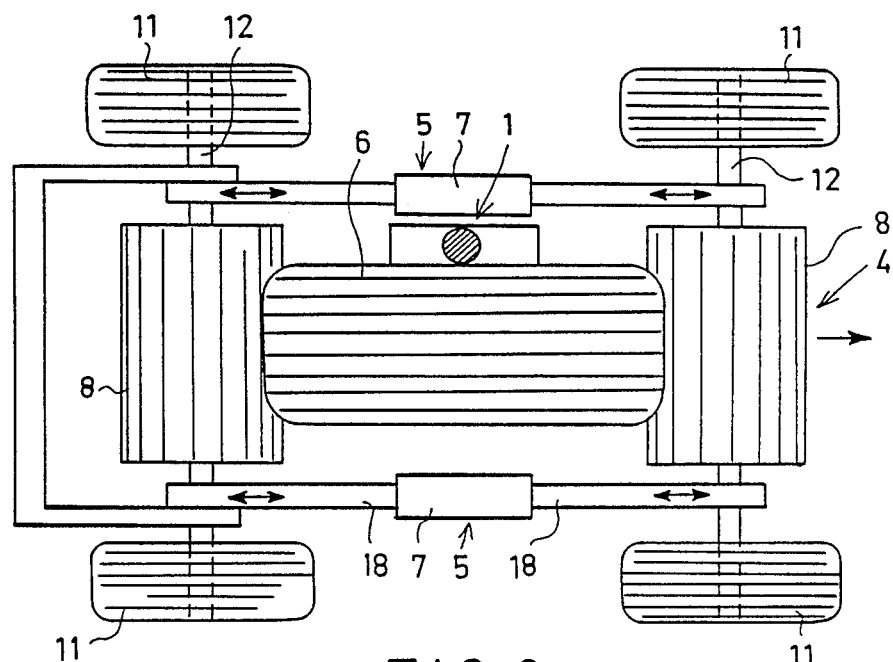
FIG. 8 is a top plan view of the moving apparatus of FIG. 7.

FIGS. 7 and 8 illustrate still another embodiment of the invention wherein the ground wheels 11 are journaled on the same axles 12 as the friction rollers 8. Axles 12 are interconnected by a pair of pressing devices 5 each of which includes a hydraulic cylinder 7 having a piston 18 extending from each end thereof, the ends of the pistons 18 being connected to axles 12. A motor 3, such as a hydraulic motor or electric motor is provided inside the right-hand one of the friction rollers 8 to serve as the drive means for the apparatus. While not shown for purposes of simplicity in FIGS. 7 and 8, suitable means may be provided to permit the right-hand one of the rollers 8 to be raised or otherwise moved out of position so as to enable the apparatus to be positioned around wheel 6 in the position shown in FIGS. 7 and 8 or, preferably, means could be provided to permit one of the pressing devices 5 to be disengaged from one of the axles 12 and raised so as to permit the apparatus to be maneuvered about wheel 6 from the side. Again, while not clear for FIGS. 7 and 8, wheels 11 could be journaled to be turnable to permit the apparatus to be maneuvered into the proper position. The operation of the device of FIGS. 7 and 8 would be substantially as previously described for the other embodiments.

Figure 9:
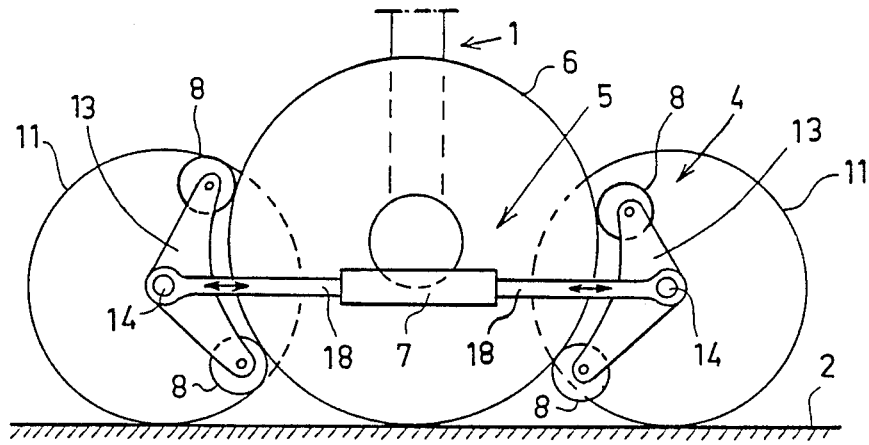
FIG. 9 is a side elevation view of a third embodiment of the moving apparatus of the invention.

FIG. 9 shows still another embodiment of the invention in which there are a pair of friction rollers 8 on each side of wheel 6, each pair of friction rollers being journaled in a pressure member 13. The pressure members 13 are journaled on the same axle 14 as the ground wheels 11. The axles 14 are interconnected by pressing devices 5 (one or more), the pressing devices 5 consisting of hydraulic cylinders 7 with pistons 18 extending from both ends thereof. The ends of the pistons 18 are connected to axles 14. A motor or motors 3 (not shown) may be provided in one or more of the rollers 8 or on the pressure members 13 to drive one or more of the rollers 8.

The embodiment shown in FIG. 9 may operate in the manner previously described in connection with other embodiments of the invention to move the aircraft 1. In addition, means generally of the type previously described, may be provided to adjust the height of the rollers 8 so that the upper and lower rollers of each pair are spaced a substantially equal vertical distance from the axis of wheel 6. Another alternative for the embodiemnt of FIG. 9 would be to eliminate cylinder 7 and to have the axles 14 connected by a bar of constant length which length is such that the upper rollers 8 are spaced from each other by a distance less than the diameter of wheels 6. The rollers 8 may then be brought into pressure contact with wheel 6 by raising the connecting bar by suitable means toward the axle of wheel 6.

Figure 10:
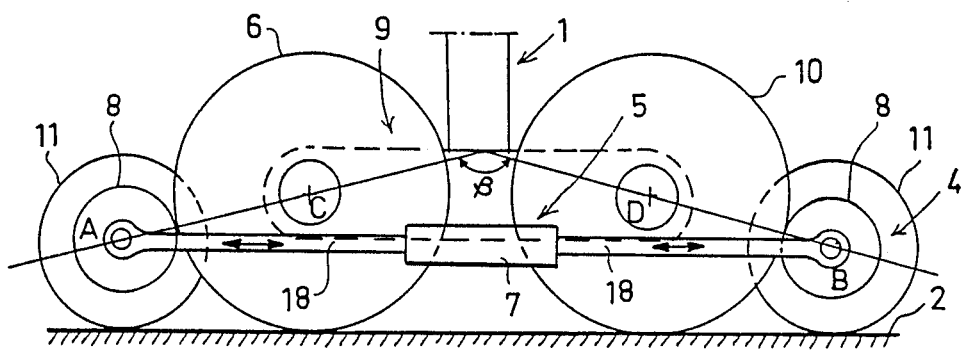
FIG. 10 is a schematic side elevation view showing the moving apparatus of the embodiment of FIG. 7 attached to a bogie.

FIG. 10 shows the embodiment of the invention of FIG. 7 being used on a bogie 9 consisting of wheels 6 and 10 rather than on a single wheel as shown in FIG. 7. This embodiment of the invention would operate in identical manner to that described previously in conjunction with FIG. 7. In this embodiment of the invention, the angle $\beta$ is formed by lines passing through the axis of the left-hand roller 8 and wheel 6 and the right-hand roller and wheel 10 respectively. The angle $\beta$, when operating with a bogie should also preferably be between 90° and 180° degrees.

Figure 11:
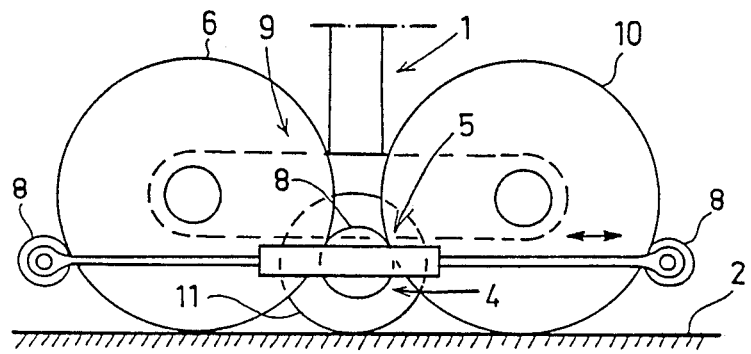
FIG. 11 is a side elevation view of a fourth embodiment of the moving apparatus of this invention.

FIG. 11 shows still another embodiment of a moving apparatus of this invention, this apparatus being provided with three friction rollers 8 which are attached to the wheels 6 and 10 of an airplane landing gear formed as a bogie 9. For this embodiment of the invention, the friction roller in the middle is connected to a motor or other suitable drive means to become the drive roller and freely rotating garound wheels 11 or journal on the same axis as this roller. In addition to the center friction roller, only one of the other two friction rollers 8 can operate as an actual friction roller, while the third friction roller serves only as a supporting roller receiving torque. Except as indicated above, the embodiment of the invention showed in FIG. 11 functions generally as indicated the embodiments of the invention previously described.

Figure 12:
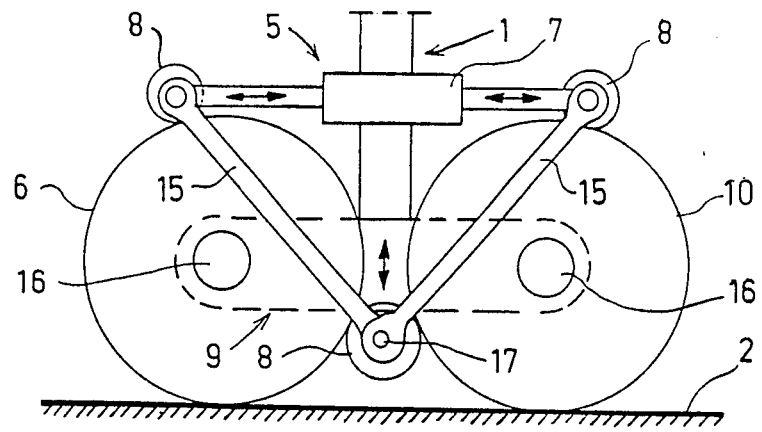
FIG. 12 is a side elevation view of a fifth embodiment of the moving apparatus of this invention.
Figure 13:
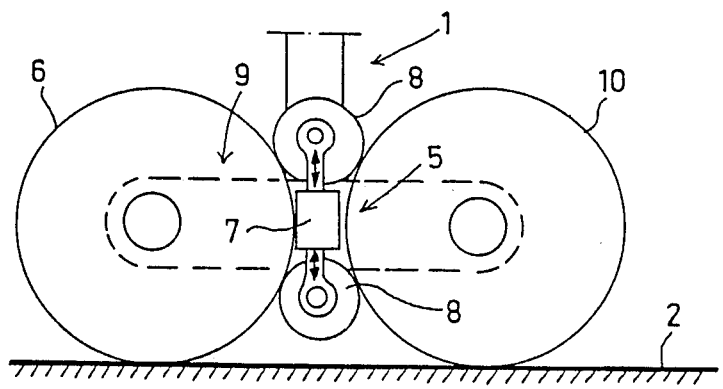
FIG. 13 is a side elevation view of a sixth embodiment of the moving apparatus of this invention.

FIGS. 12 and 13 show two additional embodiments of the invention which are adapted for use with a landing gear having two wheels 6 and 10 formed as a bogie. In the embodiment of FIG. 12, three friction rollers 8 are provided which rollers are mounted to form a triangle. A pair of connecting bars 15 are journaled on the axle 17 of the center roller and are each connected at their other end to the axle of one of the other two rollers. The two outer rollers are connected by a pressing device 5 which includes a hydraulic cylinder 7 having a piston 18 extending from each end, the outer ends of each piston being journaled on the axle of one of the outer rollers 8. In this embodiment, the friction rollers do not move toward each other as in the previous embodiments. Instead, by making the length of connecting bars 15 smaller than the diameter of the wheels 6 or 10, the pressing force is created by moving the connecting pieces of 15 toward the axles 16 of the airplane wheels.

This is accomplished by operating hydraulic cylinder 7 under control of suitable means as previously discussed to extend the pistons 18, pushing the outer friction rollers 8 away from each other. This moves the bars 15 toward the axles 16 and thus presses the rollers 8 into frictional contact with the wheels 6 and 10. Preferably, the center roller 8 is utilized as the drive roller for this embodiment of the invention.

In the embodiment of FIG. 13, a pair of friction rollers 8 are provided, the diameter of each of these friction rollers being greater than the distance between the wheels 6 and 10 of the bogie 9. As in the previous embodiment of the invention, the rollers 8 are connected by a pressing means 7 consisting of hydraulic cylinder 7 having a pair of pistons 18 extending therefrom. Except for the differences highlighted above, the embodiments of the invention shown in FIGS. 12 and 13 operate substantially as discussed in conjunction with the previous embodiments of the invention.

Figure 14:
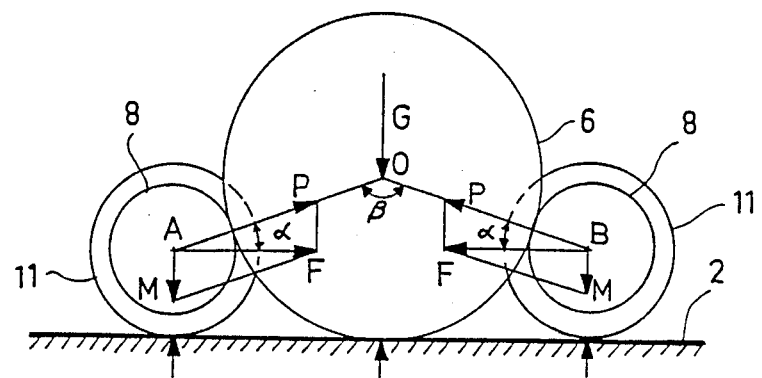
FIG. 14 is a diagram showing the forces created in the embodiment of FIG. 7.

FIG. 14 shows diagramatically the forces created within an apparatus of this invention, utilizing for purposes of illustration the embodiment shown in FIG. 7. When the friction wheels 8 are pressed toward each other with a force F, they are pressed against the wheel 6 of the airplane on two sides. At each contact point the force F has a component P in the direction of the lines A-O and B-O respectively which bears against the peripheral of the wheel and a force component M against the surface 2. FIG. 14 shows that when the angle $\alpha$ between the force vectors F and P increases, the pressing force P directed against the performing of wheel 6 by the friction rollers increases in relation to the force F. As may be seen in FIG. 14, the friction rllers 8 wedge under the wheel 6 of the airplane, resulting in the supporting force component M between the ground wheels 11 and surface 2 increasing. Stated another way, the moving apparatus takes some of the weight of the airplane. To insure proper functioning of the apparatus of this invention, the angle $\beta$ should preferably be between 90° and 180°. This is true whether the forces are being directed against a single wheel 6 or against a bogie 9 consisting of two wheels 6 and 10. In general, the angle $\beta$ must be smaller than 180° to assure proper functioning of the apparatus since a torque applied to the driven one of the rollers 8 tends to disengage the friction rollers 8 from the wheel 6 if the angle were to be any greater than this.

Figure 15:
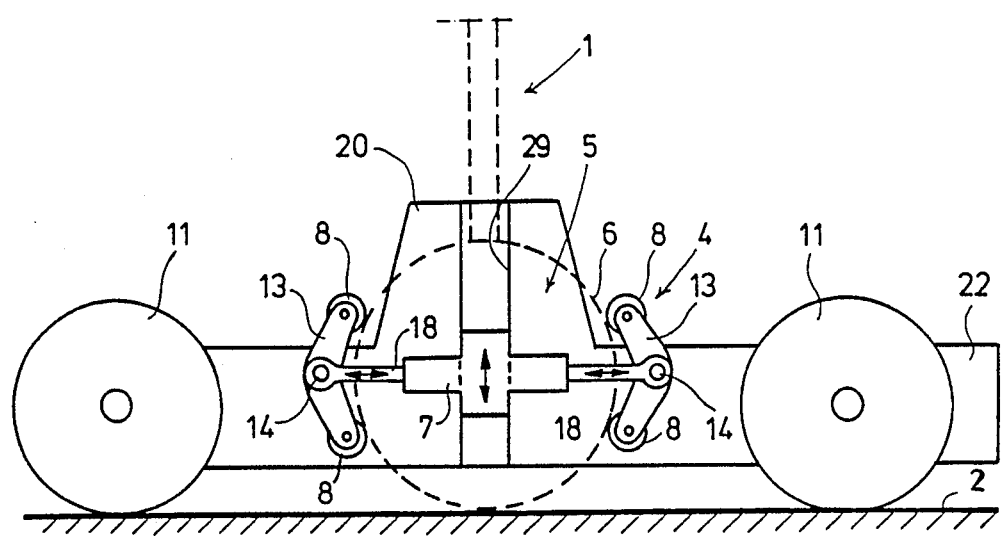
FIG. 15 is a side elevation view of a seventh embodiment of the moving apparatus of this invention.

FIG. 15 shows another embodiment of the moving apparatus according to this invention which embodiment is similar to that of FIG. 9 in that a pair of pressing members 13 are provided, each of which has a pair of friction rollers 8 journaled thereon and each of which pressing members is journaled at a hinge point 14 at the end of a piston 18 extending from hydraulic cylinder 7 of pressing device 5. However, in this embodiment of the invention, the pressing device 5 is movable on vertical slide bars 29 attached to frame 22. Ground wheels 11 are also mounted on frame 22 and are not coaxled with the pivot points 14. By use of side bars 29, the height of pressing device 5 may be adjusted so that the piston 7 is at the height of the axle of the wheel 6 when pressure is applied. This permits the pressing members 13 to be symmetrically located with respect to wheel 6 with the vertical spacing of each friction roller on a given pressing member with respect to the axle of wheel 6 being equal. The height of pressing device 5 can be adjusted manually or hydraulic or other suitable means may be provided to control this height. It is also possible to make the pressing device 5 self-centering. To accomplish this, the pressing members 13 are fixed to pistons 18 without pivot hinges 14. In the embodiment of FIG. 15, any one or more of the friction rollers 8 that can be connected to a motor in the manners previously described to operate as a drive roller.

Figure 25:
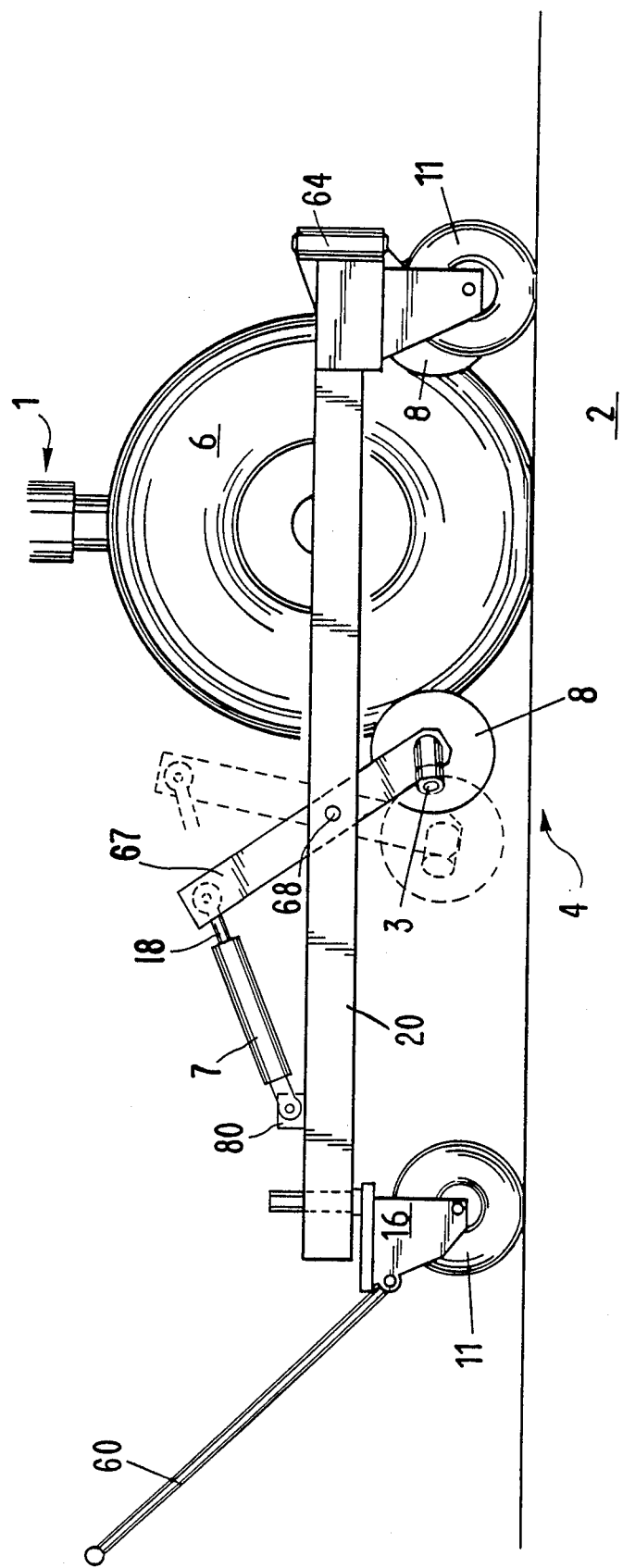
FIG. 25 is a side elevation view of a moving aparatus according to an eleventh embodiment of the invention shown in both its operative and in dotted lines in its inoperative positions to move a single wheel assembly or an assembly consisting of two coaxial wheels.
Figure 25A:
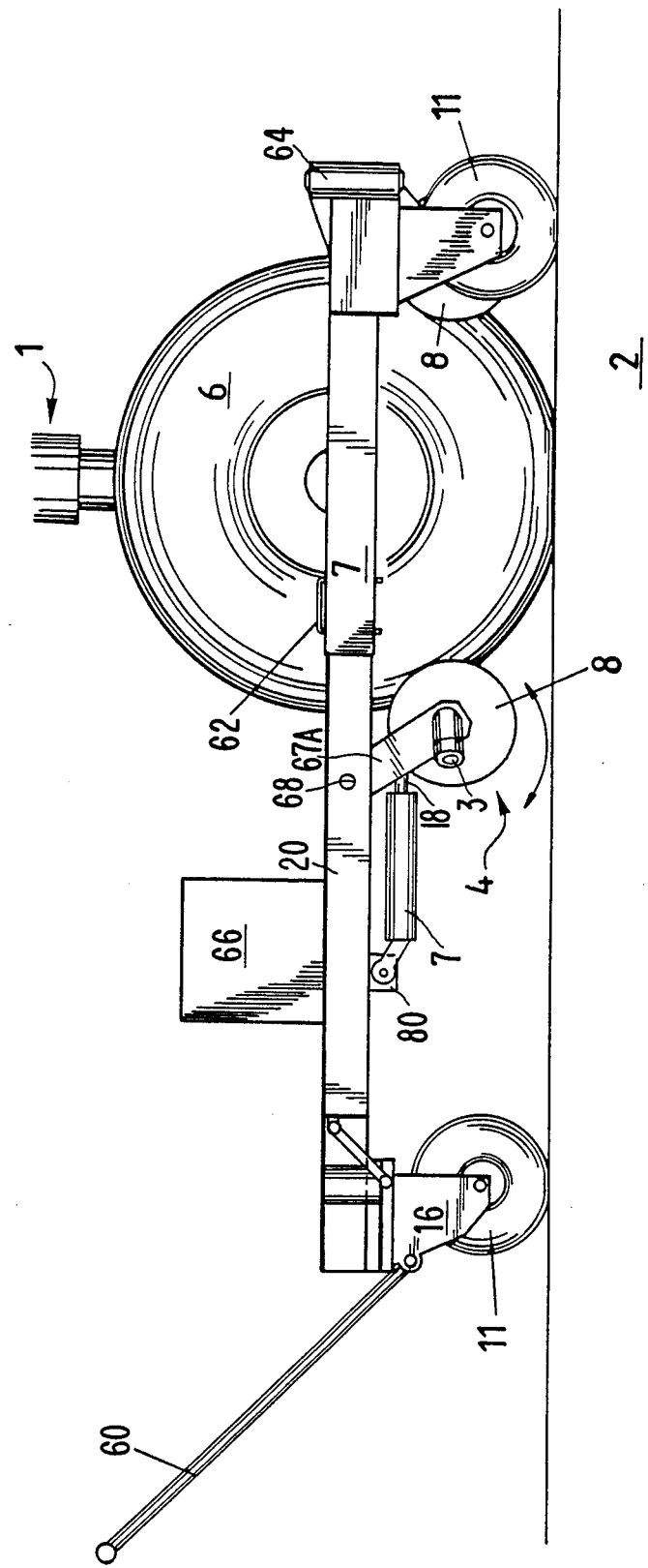
FIG. 25A is a side elevation view of a moving apparatus according to a twelfth embodiment of the invention shown in position to move a single wheel assembly or an assembly having two coaxial wheels.
Figure 26:
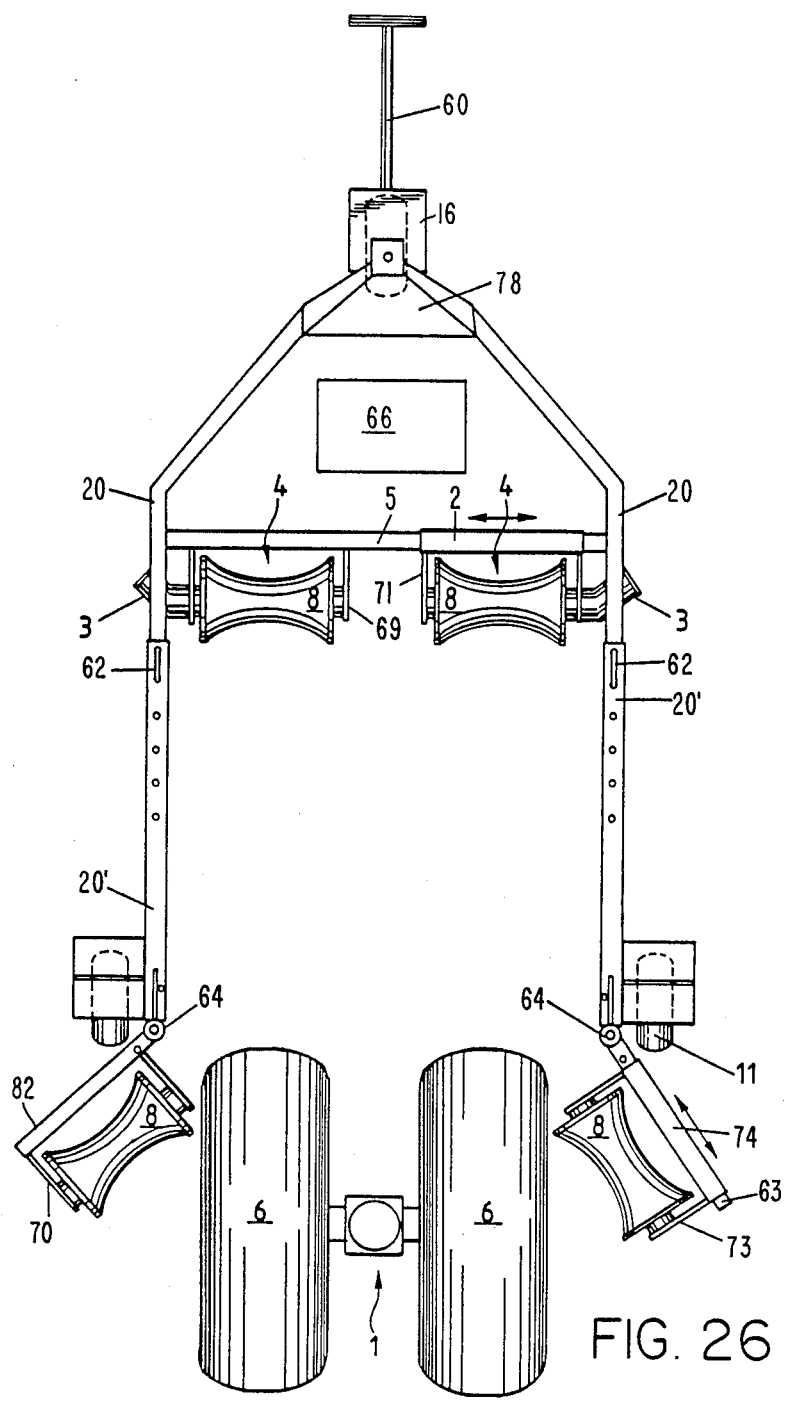
FIG. 26 is a top plan view of the moving apparatus of a thirteenth embodiment of the invention showing the apparatus in an inoperative position to receive a wheel assembly having two coaxial wheels.
Figure 27:
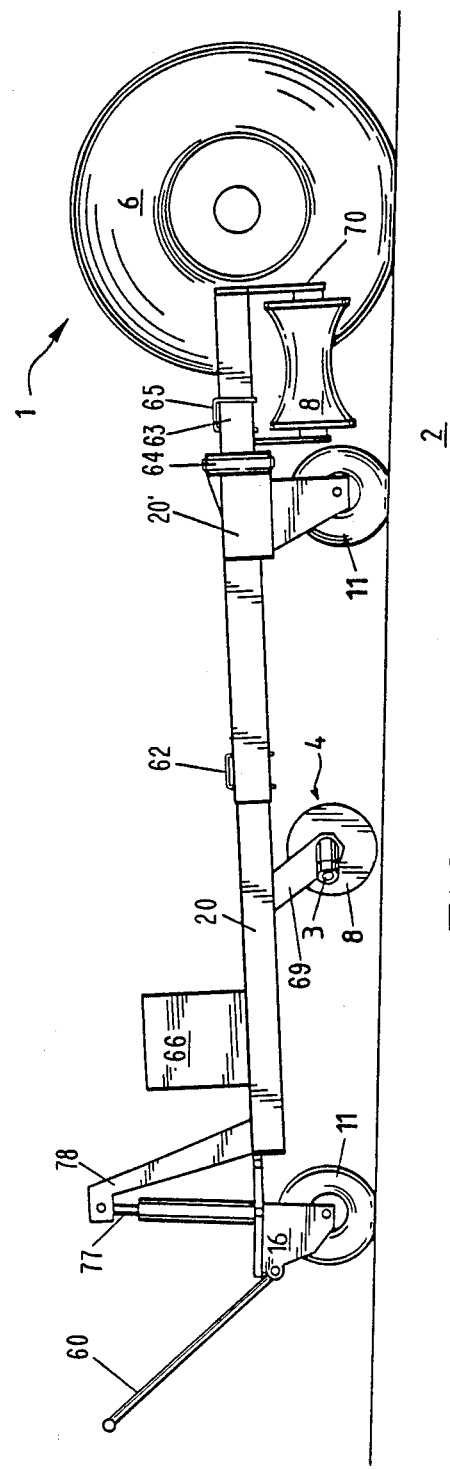
FIG. 27 is a side elevation view of the embodiment of the invention shown in FIG. 26 in the inoperative position.

FIGS. 25 and 25A show two additional embodiments of the invention. The frame 20 in these embodiments may be in the form shown in FIG. 26 for another embodiment of the invention or may have only a single pair of rollers 8 centered in the frame to accommodate a wheel assembly having a single sheel 6. Assuming that there is only a single pair of friction rollers 8, one of the friction rollers 8 is attached at the lower end of a lever arm 67 (67A in FIG. 25A) which is mounted to frame 20 at pivot point 68. In the embodiment shown in FIG. 25, the lever arm 67 extends above pivot point 68 and has the piston 18 of hydraulic cylinder 7 attached to the upper end thereof. The other end of the hydraulic cylinder is connected to frame 20 at point 80. The embodiment of FIG. 25A differs in that piston arm 18 is connected to lever arm 67A at a point between pivot point 68 and the point on the pivot arm where friction roller 8 is mounted.

In operation, cylinder 7 is initially extended as shown in dotted lines in FIG. 25 and is initially contracted in the embodiment of FIG. 25A to cause roller 8 to be in its left most or retracted position. A hinge 64 is provided to permit frame 20 to be opened in a manner to be described in more detail in conjunction with the embodiment of the invention shown in FIG. 26 to permit frame 20 to be moved around wheel 6 into the position shown in the figures. Handle 60 may be utilized to maneuver the apparatus on its ground wheels 11 into the desired position. When the apparatus has been properly positioned about wheel 6, cylinder 7 is operated to retract piston 18 in the embodiment of FIG. 25 to press the roller 8 attached to the lower end of lever arm 67 into frictional engagement with wheel 6, the wheel being pressed between the two friction rollers 8. Hydraulic motor 3 may then be operated in the manner previously described to move the vehicle. The embodiment of FIG. 25A operates in the identical manner described above except that the hydraulic cylinder 7 is extended rather than retracted to press roller 8 into engagement with wheel 6. When the plane has been moved to its desired location, the sequence of operations described above is reversed to release the wheel 6 and permit the apparatus to be removed from around wheel 6. If the apparatus shown in FIGS. 25 and 25A is utilized to drive a two-wheel assembly of the type shown in FIG. 26, separate cylinders 7 and lever arms 67 could be provided for each of the two rollers 8 which are pressed against respective wheels 6, separate lever arms could be provided for each rollers which lever arms are operated from a common cylinder 7, or separate cylinders 7 and lever arms 67 could be provided for each of the two rollers 8.

The final embodiment, the embodiment of FIGS. 26-29, has a generally U-shaped frame 20 the ends of which are telescoped into extension frame members 20'. The length of the frame member may be adjusted to accommodate various size wheels 6 by adjusting the amount by which the arms of frame 20 telescope into members 20' and holding the two members together at the desired length with U-shaped pins 62.

The apparatus of this embodiment is adapted to operate with a wheel assembly having two coaxial wheels 6 but could be used with the other wheel assemblies described earlier with obvious modification. The rear drive rollers 8 are supported in cradles 70 and 73 and the front rollers 8 are mounted in cradles 69 and 71. Cradle 71 is attached to a slide bushing 72 which may move on slide bar 75 and cradle 73 is attached to slide bushing 74 which may move on arm 63. This permits the position of the roller to be adjusted to compensate for variations in the width of the wheels 6 and in the spacing therebetween. The convex shape of the roller out surfaces is also self-correcting to correct for any minor errors in roller placement and to maintain the wheels centered on the rollers in operation. Arm 63 and arm 82 to which cradle 70 is attached are attached to extension members 20' by hinges 64. This permits the arms 63 and 82 and the rollers attached thereto to be swung to an open and operative position permitting the apparatus to be positioned around the wheels 6. The apparatus may be maneuvered into position by use of handle 60 attached to supporting cradle 16 on which turnable front wheel 11 is mounted. The apparatus may be moved into the desired position either manually or by use of a tractor or other suitable vehicle.

Figure 28:
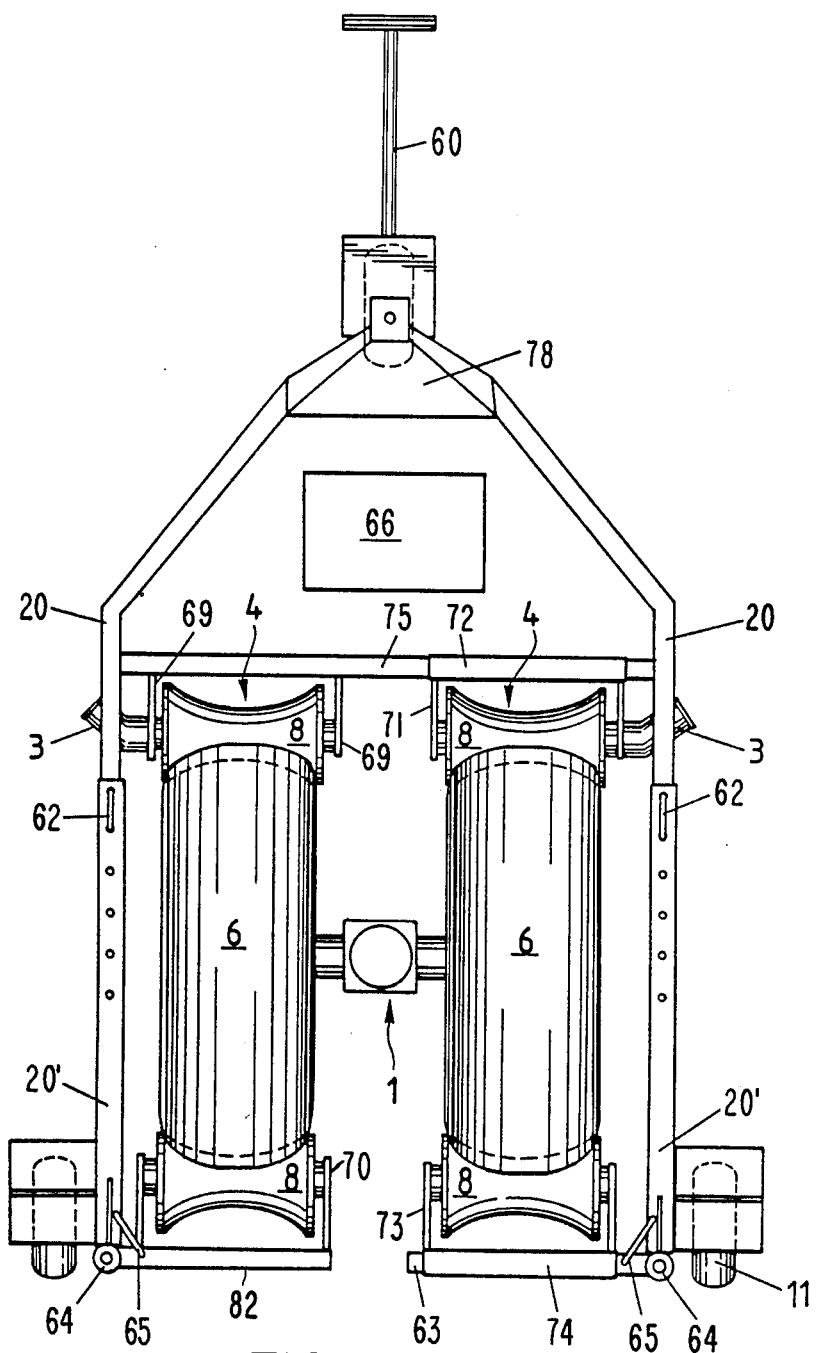
FIG. 28 is a top plan view of the embodiment of the invention shown in FIG. 26 with the wheel assembly and the apparatus in an operative position.
Figure 29:
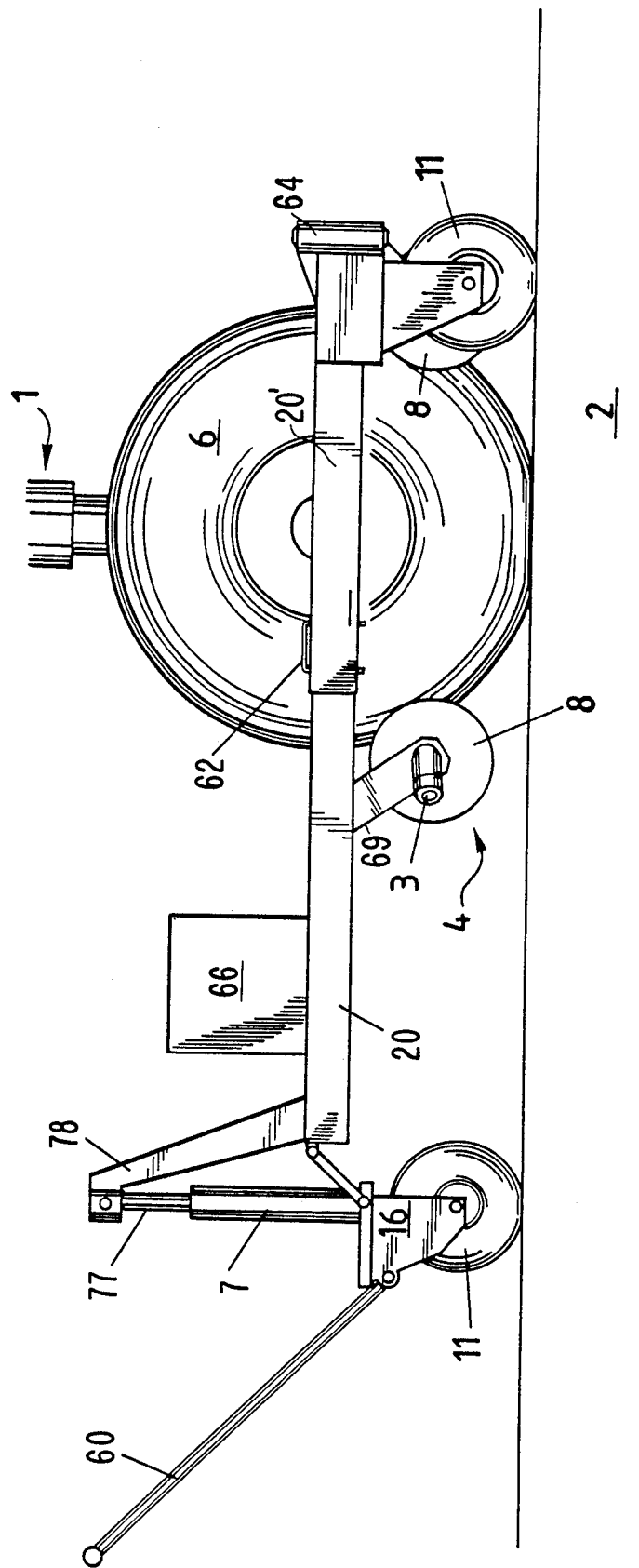
FIG. 29 is a side elevation view of the embodiment of the invention shown in FIG. 26 in the operative position shown in FIG. 28.

When the apparatus has been properly positioned about wheels 6, arms 63 and 82 are moved to their operative position shown in FIG. 28 and are held in that position by U-shaped pins 65. A hydraulic cylinder 7 mounted on supporting cradle 16 is then operated to extend its piston 77. Piston 77 is attached to support 78 mounted on the front of frame 20'. Frame 20, which is flexibly connected to cradle 16, therefore has its front end raised when cylinder 7 is operated. The raising of frame 20 raises slide bar 75 which forms part of the frame and thus raises supporting cradles 69 and 71 and the friction rollers 8 connected thereto. As the rollers 8 are raise they come adjacent to a wider portion of wheel 6. Since the rollers 8 for each wheel are spaced by a fixed distance which is less than the diameter of the wheel, raising the rollers to be adjacent a portion of the wheel having a chord length greater than the spacing of the rollers causes the rollers to be forced into frictional contact with the wheel. Hydraulic motors 3 may then be operated in a manner previously discussed to cause the vehicle 1 to be moved.

When the vehicle reaches its desired location, the process described above is reversed permitting the apparatus to be disengaged and removed from the wheels 6. A power unit 26 is shown on the apparatus which may, for example, be an internal combustion engine and hydraulic pump. As with the other embodiments, the connections between the power unit and the motors and cylinder and the various control elements, which do not form part of the present invention, are not shown.

From the above, it is apparent that the particular mechanism utilized to drive the friction rollers is not critical and that this may be accomplished by electric or hydraulic motors mounted in or connected to the rollers, either directly or through a suitable transmission system. Any other suitable means for rotating at least one of the rollers 8 is also within the contemplation of the invention. Similarly, the mechanism for operating the pressing device, which has generally been shown as a hydraulic cylinder in the various embodiments of the invention, is not critical and any suitable mechanism for controlling the spacing between the rollers and/or for causing the rollers to be pressed against the wheels of the aircraft may be utilized. The controls for the motors, for the pressing devices, and for any means required to adjust the height of rollers are again not part of this particular invention and any suitable control mechanism, located either on the apparatus or remote therefrom, may be utilized to perform these functions. Further, the number of ground wheels on the apparatus is not critical and it is possible to construct the apparatus without ground wheels, the apparatus either being supported by a transportation vehicle at least when not attached to the vehicle to be driven or utilizing or more of the friction rollers as ground wheels when necessary. Finally, while the preferred embodiments have shown the apparatus as used to move an aircraft, the teachings of this invention can be utilized to move trailers, railway cars and other wheeled vehicles.

Thus, while the invention has been particularly described with reference to a number of preferred embodiments, it would be apparent to one skilled in the art that the foregoing and other changes in form and detail may be made therein without departing from the spirit and scope of the invention.

What is claimed is:

1. An auxiliary apparatus for moving a vehicle having at least one wheel assembly on a surface, the apparatus comprising in combination:
    at least two friction rollers mounted spaced from each other;
    a connecting member for interconnecting said at least two friction rollers;
    positioning means adapted to permit said rollers to be positioned on opposite sides of a wheel assembly of said vehicle;
    pressing means for controlling the length of said connecting member between said rollers to thereby press said rollers against and into frictional contact with said wheel assembly; and
    drive means for rotating at least one of said rollers;
    whereby at least one wheel of said wheel assembly may be rotated by said roller to move said vehicle.

2. An apparatus as claimed in claim 1 wherein said wheel assembly is a single wheel, said rollers being positioned on opposite horizontal sides of said wheel and being pressable against opposite sides of said wheel by said pressing means.

3. An apparatus as claimed in claim 1 wherein said wheel assembly is a group of wheels formed by a bogie, said rollers being positioned on opposite sides of at least two wheels of said bogie and each roller being pressable against at least one opposite side of at least one of said wheels.

4. An apparatus as claimed in claim 3 wherein there are three of said friction rollers mounted to form a triangle and adapted to be positioned with one roller in contact with two of said wheels at a vertical position on one side of the axis of said wheels and the other two rollers being respectively in contact with the opposite side of each said wheels from said one roller and at a vertical position on the other side of said axis;
    wherein said connecting member connects of each of said rollers to the other rollers; and
    wherein said pressing means includes means for controlling the length of the connecting member connecting said other two rollers for controlling the spacing between said rollers, the rollers being pressed against said wheels when the spacing between said other two rollers is increased.

5. An apparatus as claimed in claim 3 wherein there are two of said rollers adapted to be positioned between and in contact with two of said wheels, one of said rollers being in contact with said rollers at a point above the axis of said wheels and the other of said rollers being in contact at a point below said axis; and
    wherein said pressing means includes means for controlling the length of the connecting member therebetween.

6. An apparatus as claimed in claim 1 wherein said wheel assembly has at least one wheel which rotates about an axis; and wherein said rollers are positioned so that the point of contact of at least one of said rollers with said wheel is below the level of said axis.

7. An apparatus as claimed in claim 1 wherein said rollers are mounted so that, when they are pressed against the wheel assembly by said pressing means, the pressing forces of said rollers against said wheel assembly are at an angle to each other which angle is between 90° and 180°.

8. An apparatus as claimed in claim 1 wherein said pressing means includes at least two pressing members which members are adapted to be positioned on opposite sides of said wheel assembly, at least two of said friction rollers being mounted on each of said pressing members, and means for controlling the spacing between said pressing members, whereby the rollers on said pressing members may be pressed against opposite sides of said wheel assembly.

9. An apparatus as claimed in claim 8 wherein said connecting member is hingingly connected to each pressing member at a point between the friction rollers mounted thereon, said pressing means including means for controlling the length of said connecting member to control the spacing between said pressing members.

10. An apparatus as claimed in claim 8 wherein said wheel assembly includes at least one wheel having an axis; and
    wherein said friction rollers are mounted on each pressing member so that the rollers of each pressing member press against said wheel on opposite sides of said axis.

11. An apparatus as claimed in claim 10 including means for adjusting the height of said pressing members according to the size of said wheel so that the vertical distances of the points at which the rollers of each pressing member contact said wheel from the axis of the wheel are substantially equal.

12. An apparatus as claimed in claim 1 wherein said connecting member connects at least two of said rollers a fixed distance apart which distance is less than the maximum width of said wheel assembly; and
    wherein said pressing means includes means for moving said connecting member toward the axis of at least one wheel of said wheel assembly to thereby press said rollers against said wheel assembly.

13. An apparatus as claimed in claim 1 wherein said positioning means includes means for moving at least one of said rollers to an inoperative position to permit at least one wheel of a wheel assembly to be positioned between or removed from a position between said rollers.

14. An apparatus as claimed in claim 1 including a frame; means for mounting said rollers and said pressing means in said frame; and
    wherein said positioning means includes at least one ground wheel attached to said frame and adapted to rest on said surface.

15. An apparatus as claimed in claim 14 wherein said ground wheel is freely turnable at least while said apparatus is moving.

16. An apparatus as claimed in claim 14 wherein said positioning means includes a power source adapted to rotate at least one of said ground wheels at least when said apparatus is not positioned to move said vehicle.

17. An apparatus as claimed in claim 14 wherein said positioning means includes four ground wheels attached to said frame.

18. An apparatus as claimed in claim 14 wherein at least one of said ground wheels is coaxial with at least one of said rollers.

19. An apparatus as claimed in claim 18 wherein there are two of said rollers, each of which is coaxial with two of said grounds wheels;
wherein said connecting member connects the axles of said rollers; and
wherein said pressing means controls the spacing between said axles.

20. An apparatus as claimed in claim 14 wherein said pressing means includes at least two pressing members which members are adapted to be positioned on opposite sides of said wheel assembly, at least two of said friction rollers being mounted on each of said pressing members, and means for hingingly mounting said pressing members; and
wherein there is at least one pair of said ground wheels mounted on a common axle, said axle passing through the hinge point of at least one of said pressing members.

21. An apparatus as claimed in claim 14 wherein at least one of said ground wheels is turnable to steer said apparatus.

22. An apparatus as claimed in claim 21 wherein there are at least three of said ground wheels; and
wherein all of said ground wheels are turnable.

23. An apparatus as claimed in claim 21 wherein said positioning means includes an opening formed on one side to permit said apparatus to be maneuvered by said ground wheels into a position with said rollers in proximity with said wheel assembly.

24. An apparatus as claimed in claim 23 wherein said positioning means includes guide means mounted on said frame adjacent the opening in said side, said guide means being adapted to guide one or more wheels of said wheel assembly through said opening into said frame.

25. An apparatus as claimed in claim 23
wherein said opening is in an end of said frame; and
wherein said apparatus is maneuvered toward said wheel assembly from a direction perpendicular to the axis of at least one wheel of said wheel assembly.

26. An apparatus as claimed in claim 25 wherein said positioning means includes means for moving at least one of said rollers to an inoperative position out of the path of said wheel assembly when said apparatus is being maneuvered into position and for returning said at least one roller to an operative position when said apparatus is properly positioned in proximity to said wheel assembly.

27. An apparatus as claimed in claim 26 wherein the means for moving the rollers includes means for raising said at least one roller to be substantially vertical when in said inoperative position and for returning said at least one roller to be substantially horizontal when in said operative position.

28. An apparatus as claimed in claim 23 wherein said opening is in a side of said frame; and
wherein said apparatus is maneuvered toward said wheel assembly from a direction parallel to the axis of at least one wheel of said wheel assembly.

29. An apparatus as claimed in claim 23 wherein said frame includes a U-shaped member adapted to fit around said wheel assembly, and a slide bar projecting from one end of said member; and wherein said pressing means includes a slide element mounted to slide on said slide bar toward and away from said member, means for mounting at least one roller on said element, and means for sliding said element on said slide bar to press said at least one roller against said wheel assembly.

30. An apparatus as claimed in claim 23 wherein said frame is a U-shaped structure adapted to fit around said wheel assembly; and wherein said pressing means includes means for controlling the length of the connecting leg of said U-shaped structure.

31. An apparatus as claimed in claim 30 wherein said connecting leg includes two spaced parallel bars consisting of first and second interconnected slide sections which may be moved relative to each other in a direction parallel to said bars, and
wherein said pressing means includes means for moving said sections relative to each other to control the length of said connecting leg; and
including means for mounting at least one of said rollers to move with each of said sections.

32. An apparatus as claimed in claim 1 wherein there are a pair of said rollers adapted to be positioned on each horizontal side of said wheel assembly; and
wherein said drive means includes at least one drive source, and gear means for connecting said source to and for rotating at least one of said pairs of rollers.

33. An apparatus as claimed in claim 32 wherein said connecting member includes at least one slide bar interconnecting said pairs of rollers; and
wherein said pressing means includes means for controlling the length of said slide bar, whereby both pairs of rollers may be pressed against said wheel assembly.

34. An apparatus as claimed in claim 32 wherein the rollers of each pair are mounted one above the other; and
wherein said positioning means includes means for controlling the vertical position of the pairs of rollers so that the vertical spacing of the rollers of each pair from the vertical axis of the wheel assembly are equal.

35. An apparatus as claimed in claim 1 wherein said positioning means includes a wheeled transportation vehicle; and
means for mounting said pressing means and said rollers on one end of said transportation vehicle and projecting therefrom.

36. An apparatus as claimed in claim 35 including means for mounting at least one of said rollers to be placed in frictional contact with at least one wheel of said transportation vehicle, said at least one roller being one which is rotated by said drive means, whereby said transportation vehicle can also be moved by said rollers.

37. An apparatus as claimed in claim 35 wherein said drive means includes a hydraulic motor; and
including a hydraulic pump mounted on said transportation vehicle, and a pressurized hydraulic hose connecting said pump to said motor.

38. An apparatus as claimed in claim 37 wherein said connecting member forms part of a frame, at least one ground wheel mounted on said frame, and means for mounting said rollers, said pressing means and said drive means in said frame; and wherein said positioning means includes a steering and feeding device for said hydraulic hose, said device being mounted on said transportation vehicle and being adapted, when the hose is stiffened by the hydraulic pressure therein, to move the frame and the elements mounted thereon forward by feeding the hydraulic hose, backward by retracting the hose and sideward by bending the hose.

39. An apparatus as claimed in claim 38 wherein said steering and feeding device includes two pairs of rollers, means for driving one of said pairs of rollers to feed the hydraulic hose, and means to move the other pair of rollers to bend the hydraulic hose.

40. An apparatus as claimed in claim 1 wherein said connecting member is part of a U-shaped frame adopted to fit around said wheel assembly.

means for mounting said rollers and said pressing means on said frame; and wherein said pressing means includes means for controlling the length of the conencting leg of said U-shaped frame.

41. An apparatus as claimed in claim 40 wherein said connecting leg includes two spaced parallel bars consisting of first and second interconnected slide sections which may be moved relative to each other in a direction parallel to said bars, and wherein said pressing means includes means for moving said sections relative to each other to control the length of said connecting leg.

42. A method for moving a vehicle having at least one wheel assembly on a surface comprising the steps of:

positioning an auxiliary apparatus having at least two friction rollers with the friction rollers on opposite horizontal sides of said wheel assembly, at least one of said rollers being positioned below the axis of at least one wheel of said assembly;

controlling the spacing between said rollers to press all of said rollers into frictional contact with the wheels of said assembly, the contact points for at least two of said rollers being on opposite horizontal sides of said wheel assembly and the contact point for at least one of said rollers being below the axis of at least one of said wheels; and driving at least one of said rollers to rotate, thereby rotating the wheel in frictional contact therewith to move said vehicle.

43. An auxiliary apparatus for moving a vehicle having at least one wheel assembly on a surface comprising in combination:

a U-shaped frame;

means for mounting at least two friction rollers on said frame; positioning means adapted to position said frame around said wheel assembly with said rollers positioned on opposite horizontal sides of said wheel assembly;

means for controlling the length of the connecting leg of said U-shaped frame, said means being operative when the length of said leg is shortened to press all said rollers into frictional contact with the wheels of said wheel assembly; and drive means for rotating at least one of said rollers;

whereby at least one wheel of said wheel assembly may be rotated by said roller to move said vehicle.

44. An auxiliary apparatus for moving a vehicle having at least one wheel assembly on a surface, the auxiliary apparatus being locatable independent of the vehicle to be moved, the auxiliary apparatus comprising in combination:

at least two friction rollers:

means for positioning said friction rollers with at least one of said rollers on each horizontal side of said wheel assembly and with at least one of said rollers being positioned below the axis of at least one wheel of said assembly;

means for moving at least one of said rollers in a direction to cause all of said rollers to be pressed into frictional contact with the wheel or wheels of said assembly, the contact points for at least two of said rollers being on opposite horizontal sides of said wheel assembly and the contact point for at least one of said rollers being below the axis of at least one of said wheels; and means for driving at least one of said rollers to rotate, thereby rotating the wheel in frictional contact therewith to move said vehicle.

45. An apparatus as claimed in claim 44 wherein said means for moving include means for controlling the spacing between said rollers to press said rollers against opposite horizontal sides of the wheel assembly.

46. An apparatus as claimed in claim 45 including a connecting member for interconnecting said at least two friction rollers; and wherein said means for controlling the spacing between said rollers includes means for controlling the length of said connecting member.

47. An apparatus as claimed in claim 45 including a pivotally mounted lever arm having at least one of said friction rollers attached at one end thereof; and wherein said means for controlling includes means for pivoting said lever arm to move the roller at the end thereof toward the roller on the opposite horizontal side of said wheel assembly, pressing the wheel assembly therebetween.

48. An apparatus as claimd in claim 47 including a frame on which said lever arm is pivoted; and wherein said means for pivoting includes a piston connected at one end to said lever arm and at the other end to said frame, said piston being operative to pivot said lever arm to move the roller at the end thereof in a desired direction.

49. An apparatus as claimed in claim 48 wherein said piston connects to said lever arm at a point which is on the opposite side of the point where said arm is pivoted from said roller, said piston being operative to pull the lever arm to move the roller to press the wheel assembly.

50. An apparatus as claimed in claim 48 wherein said piston connects to said lever arm at a point between the pivot point for the arm and said roller, said piston being operative to push the lever arm to move the roller to press the wheel assembly.

51. An apparatus as claimed in claim 44 including a frame; means for mounting at least two of said rollers to said frame in a manner such that they are spaced by a predetermined distance, said distance being less than the maximum horizontal width of said wheel assembly, said frame being normally positioned with said rollers adjacent to a lower portion of said wheel assembly having a width less than said predetermined distance; and wherein said means for moving includes means for raising at least one of said rollers to be adjacent to a portion of said wheel assembly having a width greater than said predetermined distance to press said rollers into frictional contact with said wheels.

52. An apparatus as claimed in claim 51 including a cradle;
at least one ground wheel mounted on said cradle;
means for flexibly attaching said frame to said cradle; and
wherein said means for raising includes a hydraulic cylinder mounted on said cradle, said cylinder having a piston extending therefrom and means for attaching the piston to the frame, said cylinder being operable to extent its piston thereby raising the frame.

53. An apparatus as claimed in claim 51 wherein said wheel assembly has two coaxial wheels;
wherein there is a pair of said rollers for each of said wheels;
wherein said predetermined distance is less than the diameter of one of said wheels; and
wherein said rollers are normally positioned adjacent to a portion of said wheels having a chord less than said predetermined distance.

54. An apparatus as claimed in claim 51 including means for altering said predetermined distance to permit the apparatus to be used with wheel assemblies having different horizontal widths.

55. An apparatus as claimed in claim 54 wherein said frame is a U-shaped member the arms of which telescope into a pair of extension members; and
wherein said means for altering includes pin means for securing said frame arms to aid extension members with a predetermined combined length.

56. An apparatus as claimed in claim 44 wherein said rollers are spaced by a predetermined distance when in an inoperative position before being moved by said moving means; and
including means for altering said predetermined distance to permit the apparatus to be used with wheel assemblies having different horizontal widths.

57. An apparatus as claimed in claim 44 including means for altering the height of said rollers when said rollers are in an inoperative position before being moved by said moving means to permit the apparatus to be used with wheel assemblies having different size wheels.

58. An apparatus as claimed in claim 44 wherein said wheel assembly has two coaxial wheels;
wherein there is a pair of friction rollers for each of said wheels;
including a frame; and
means for mounting said rollers on said frame, said means including means for adjusting the lateral position of at least one pair of said rollers to permit the apparatus to be used with wheel assemblies having different size wheels and/or different spacing between wheels.

59. An apparatus as claimed in claim 44 wherein the outer surfaces of the rollers are shaped to maintain the wheel in frictional contact therewith centered on the roller.

60. An apparatus as claimed in claim 59 wherein each of said rollers has a curved convex outer surface with the diameter of each roller being greater at its outer edges and least at its center.

61. An apparatus as claimed in claim 44 wherein said means for positioning includes means for permitting at least one of the rollers to be moved to an inoperative position to permit the apparatus to be properly positioned relative to said wheel assembly.

62. A method for moving a vehicle having a least one wheel assembly on a surface comprising the steps of:
providing an auxiliary apparatus locatable independent of the vehicle to be moved and having at least two friction rollers;
positioning the auxiliary apparatus with the friction rollers on opposite horizontal sides of said wheel assembly, at least one of said rollers being positioned below the axis of at least one wheel of said assembly;
moving at least one of said rollers in a direction to cause all of said rollers to be pressed into frictional contact with the wheels of said assembly, the contact points for at least two of said rollers being on opposite horizontal sides of said wheel assembly and the contact point for at least one of said rollers being below the axis of at least one of said wheels; and
driving at least one of said rollers to rotate, thereby rotating the wheel in frictional contact therewith to move said vehicle.

63. An auxiliary apparatus for moving a vehicle having at least one wheel assembly on a surface, the auxiliary aparatus being locatable independent of the vehicle to be moved, the auxiliary apparatus comprising in combination:
at least two friction rollers:
means for positioning said friction rollers with at least one of said rollers on each horizontal side of said wheel assembly and with at least one of said rollers being positioned below the axis of at least one wheel of said assembly;
means for controlling the spacing said rollers to press all of said rollers into frictional contact with the wheels of said assembly, the contact points for at least two of said rollers being on opposite horizontal sides of said wheel assembly and the contact point for at least one of said rollers being below the axis of at least one of said wheels; and
means for driving at least one of said rollers to rotate, thereby rotating the wheel in frictional contact therewith to move said vehicle.

* * * * *